US011100585B1

(12) United States Patent
Sandulli

(10) Patent No.: US 11,100,585 B1
(45) Date of Patent: Aug. 24, 2021

(54) SEPARATELY TRADED REGISTERED DISCOUNT INCOME AND EQUITY SECURITIES AND SYSTEMS AND METHODS FOR TRADING THEREOF

(71) Applicant: METAURUS LLC, New York, NY (US)

(72) Inventor: Richard P. Sandulli, Kamuela, HI (US)

(73) Assignee: METAURUS, LLC, New York, NY (US)

( * ) Notice: Subject to any disclaimer, the term of this patent is extended or adjusted under 35 U.S.C. 154(b) by 0 days.

(21) Appl. No.: 16/452,123

(22) Filed: Jun. 25, 2019

Related U.S. Application Data

(63) Continuation of application No. 14/827,354, filed on Aug. 17, 2015, now Pat. No. 10,339,603.

(60) Provisional application No. 62/037,651, filed on Aug. 15, 2014, provisional application No. 62/119,721, filed on Feb. 23, 2015.

(51) Int. Cl.
  *G06Q 40/00* (2012.01)
  *G06Q 40/06* (2012.01)
  *G06Q 10/04* (2012.01)

(52) U.S. Cl.
  CPC ............. *G06Q 40/06* (2013.01); *G06Q 10/04* (2013.01)

(58) Field of Classification Search
  None
  See application file for complete search history.

(56) References Cited

U.S. PATENT DOCUMENTS

| | | | |
|---|---|---|---|
| 4,093,276 A * | 6/1978 | Debe | B42D 25/29 283/117 |
| 5,671,358 A | 9/1997 | Debe | |
| 5,758,097 A | 5/1998 | Debe et al. | |
| 6,381,585 B1 | 4/2002 | Maples et al. | |
| 7,096,195 B1 | 8/2006 | Maples | |
| 7,096,494 B1 * | 8/2006 | Chen | G06Q 20/04 380/259 |
| 7,107,239 B2 * | 9/2006 | Graff | G06Q 30/06 705/31 |
| 7,249,075 B1 | 7/2007 | Altomare | |
| 7,359,875 B1 | 4/2008 | Millette et al. | |
| 7,444,300 B1 | 10/2008 | Broms et al. | |
| 7,580,875 B1 | 8/2009 | Finn et al. | |
| 7,865,426 B2 * | 1/2011 | Volpert | G06Q 40/00 705/37 |
| 7,987,131 B2 | 7/2011 | Penzak | |
| 8,108,292 B1 | 1/2012 | Borowski | |

(Continued)

FOREIGN PATENT DOCUMENTS

EP    0795162 B1    9/2002

*Primary Examiner* — William J Jacob
(74) *Attorney, Agent, or Firm* — Rita C. Chipperson; Chipperson Law Group, P.C.

(57) ABSTRACT

Systems and methods for creating different financial interests in a portfolio of stocks, a stock index or other financial assets based on a series of interim cash flows of the asset. Specifically, the present invention relates to systems and methods for dividing such assets into income and equity components. In one aspect, the income component is an ordinary dividend component for a fixed time period or until a fixed dollar amount has been paid and the equity component is a capital component that can be traded separately.

16 Claims, 20 Drawing Sheets

(56) References Cited

U.S. PATENT DOCUMENTS

| | | | |
|---|---|---|---|
| 2002/0046154 A1* | 4/2002 | Pritchard | G06Q 40/04 705/37 |
| 2002/0077837 A1* | 6/2002 | Krueger | G06Q 20/24 705/39 |
| 2002/0161684 A1* | 10/2002 | Whitworth | G06Q 40/06 705/36 R |
| 2003/0191945 A1* | 10/2003 | Keech | G06Q 20/341 713/182 |
| 2004/0230507 A1* | 11/2004 | Davidovitch | G06Q 40/00 705/35 |
| 2005/0035847 A1* | 2/2005 | Bonalle | G06Q 20/10 340/5.61 |
| 2005/0125323 A1 | 6/2005 | Warren | |
| 2008/0065532 A1* | 3/2008 | De La Motte | G06Q 40/00 705/39 |
| 2008/0147464 A1* | 6/2008 | Sauter | G06Q 20/1085 705/37 |
| 2008/0215500 A1 | 9/2008 | De La | |
| 2009/0063345 A1* | 3/2009 | Erikson | G06Q 20/102 705/44 |
| 2009/0187509 A1* | 7/2009 | McNamee | G06Q 30/0283 705/80 |
| 2011/0173138 A1 | 7/2011 | Ryan | |
| 2012/0239579 A1* | 9/2012 | Wolfs | G06Q 20/18 705/72 |
| 2013/0085887 A1* | 4/2013 | Zhang | G06Q 40/00 705/26.8 |
| 2013/0226803 A1* | 8/2013 | Hsu | G06Q 20/385 705/44 |
| 2014/0081733 A1* | 3/2014 | Morris | G06Q 20/384 705/14.26 |
| 2017/0109752 A1* | 4/2017 | Hubbard | G06Q 20/34 |

\* cited by examiner

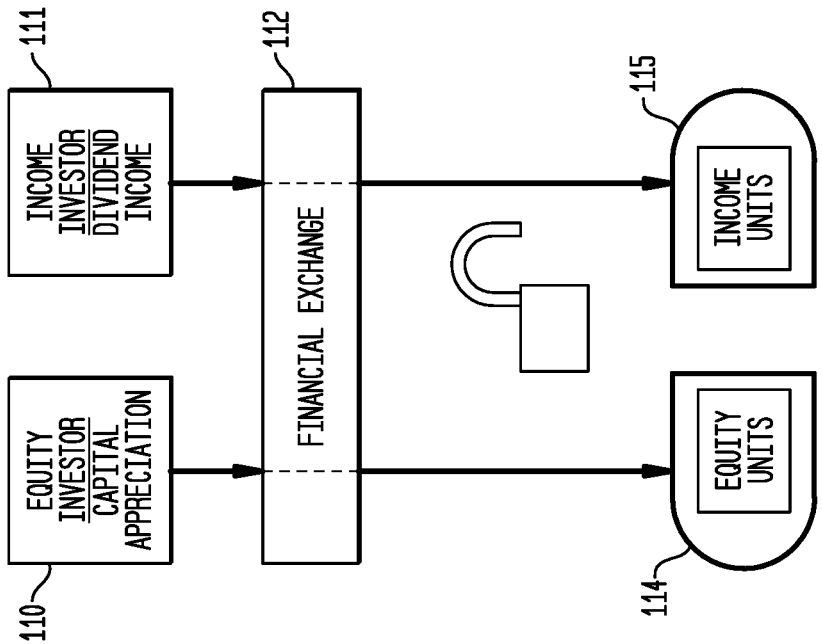
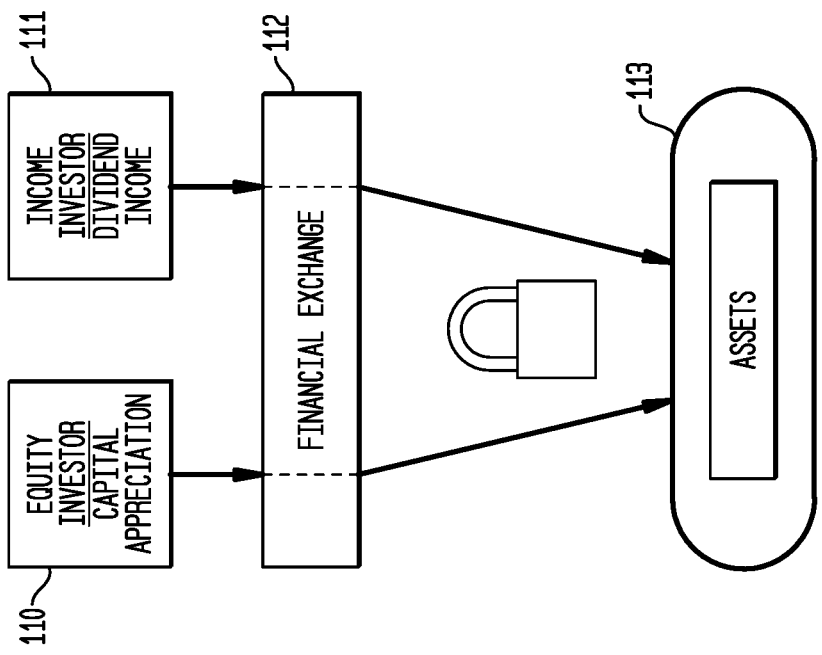

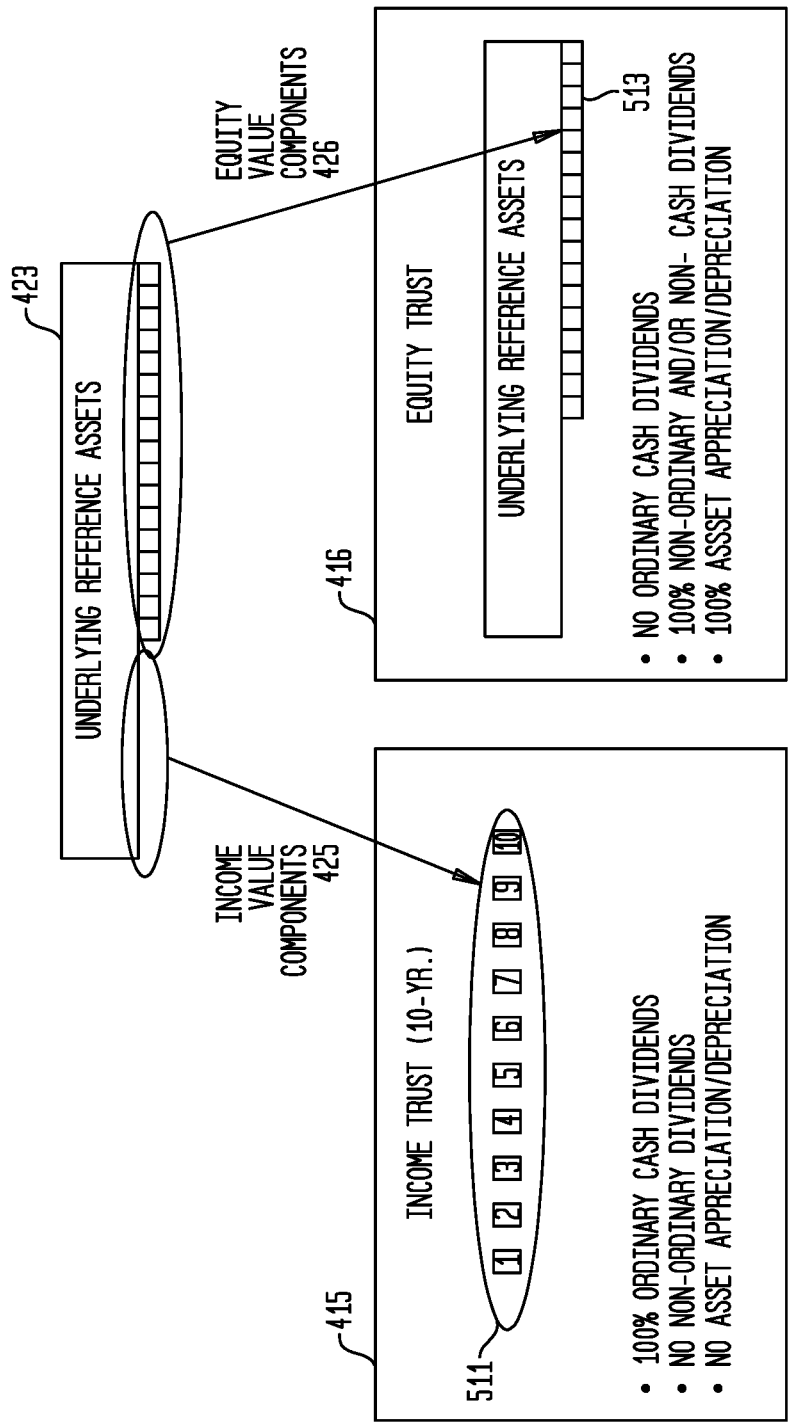

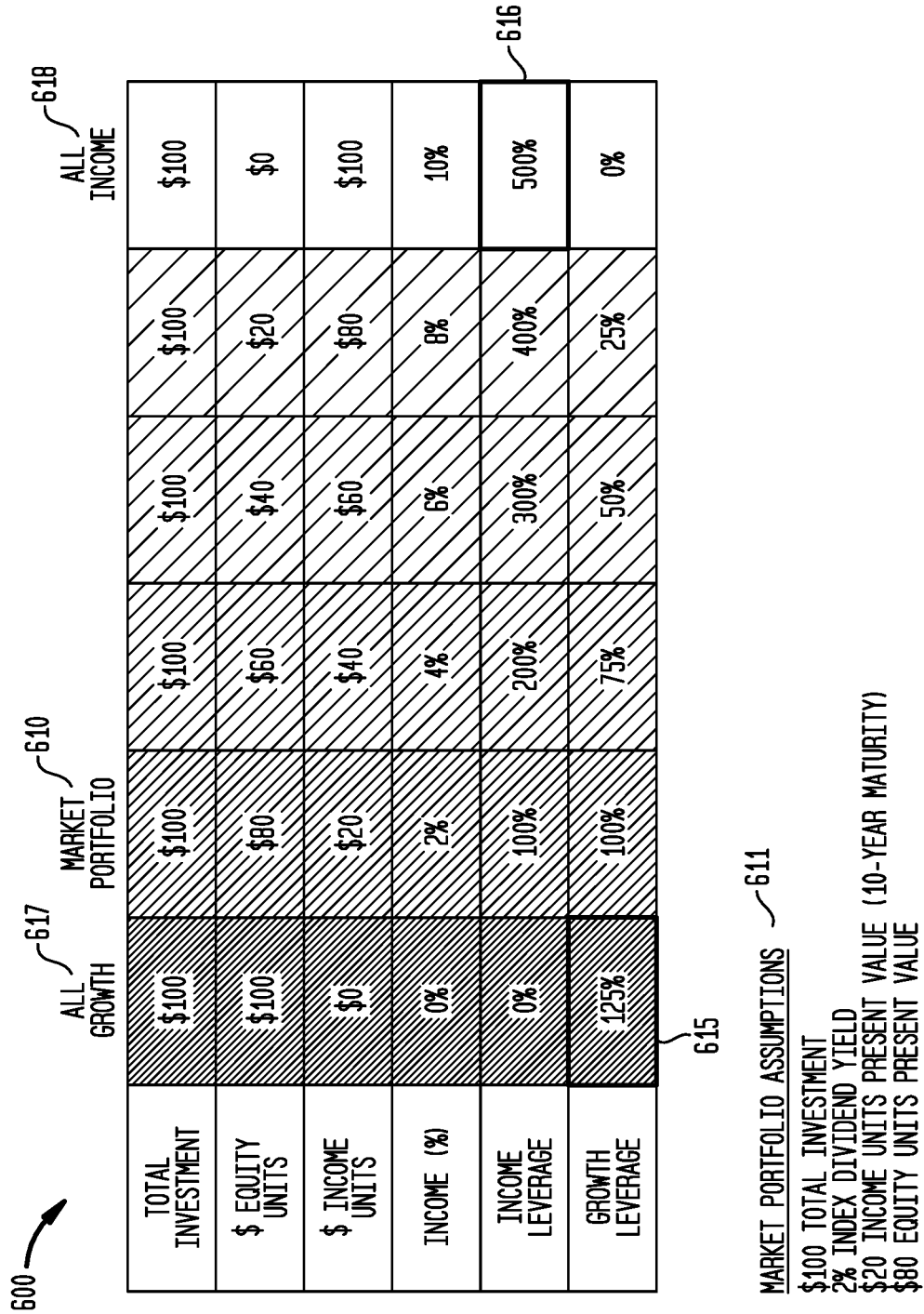

FIG. 6A

TARGET DIVIDEND INCOME AND CAPITAL LEVERAGE
VARIOUS INCOME UNIT AND EQUITY UNIT PORTFOLIOS

|  | ALL GROWTH | MARKET PORTFOLIO |  |  |  | ALL INCOME |
|---|---|---|---|---|---|---|
| TOTAL INVESTMENT | $100 | $100 | $100 | $100 | $100 | $100 |
| $ EQUITY UNITS | $100 | $80 | $60 | $40 | $20 | $0 |
| $ INCOME UNITS | $0 | $20 | $40 | $60 | $80 | $100 |
| INCOME (%) | 0% | 2% | 4% | 6% | 8% | 10% |
| INCOME LEVERAGE | 0% | 100% | 200% | 300% | 400% | 500% |
| GROWTH LEVERAGE | 125% | 100% | 75% | 50% | 25% | 0% |

MARKET PORTFOLIO ASSUMPTIONS
$100 TOTAL INVESTMENT
2% INDEX DIVIDEND YIELD
$20 INCOME UNITS PRESENT VALUE (10-YEAR MATURITY)
$80 EQUITY UNITS PRESENT VALUE

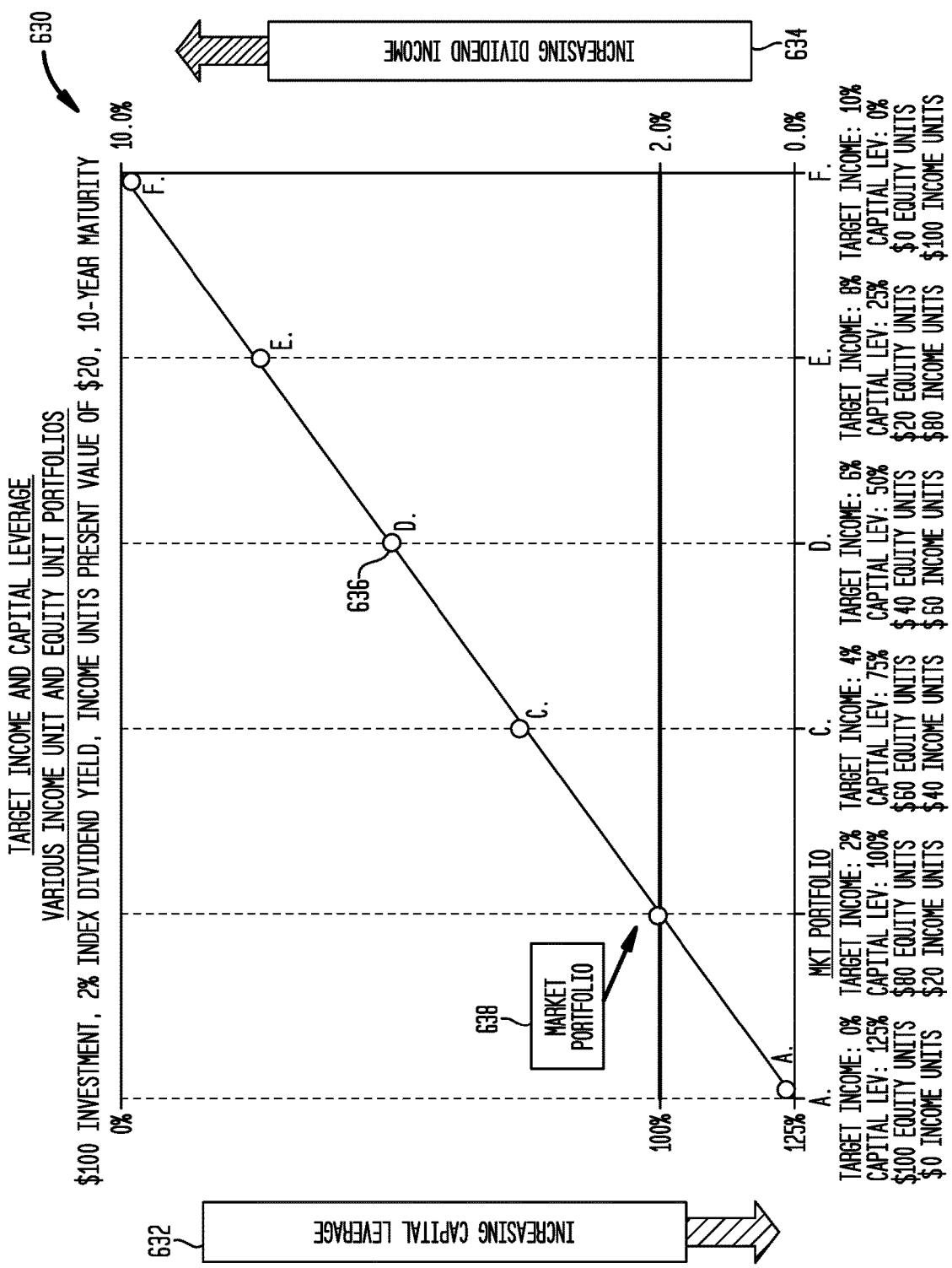

US 11,100,585 B1

SEPARATELY TRADED REGISTERED DISCOUNT INCOME AND EQUITY SECURITIES AND SYSTEMS AND METHODS FOR TRADING THEREOF

COPYRIGHT NOTICE

A portion of the disclosure of this patent document contains material which is or may be subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Embodiments of the present invention generally relate to systems and methods for creating different financial interests in a portfolio of stocks, a stock index or other financial assets (i.e., underlying reference assets) based on a series of interim cash flows of the underlying reference asset(s). Specifically, the present invention relates to systems and methods for dividing such assets into a plurality of components that are separately tradeable. In one embodiment, a first component is an ordinary dividend component of one or more underlying reference assets (i.e., ordinary dividends paid for a fixed time period or until a fixed dollar amount has been paid) and a second component includes both the capital (e.g., appreciation/depreciation of the underlying reference assets) and the non-ordinary dividends (e.g., non-ordinary cash dividends, stock dividends, etc.) of the underlying reference assets. However, alternate methods of dividing the asset components may be substituted including, without limitation, separating all dividend components (ordinary and non-ordinary) from the capital component of the underlying reference assets. Or, separating the dividend component of only a first portion of the underlying reference assets from the capital component of all underlying reference assets and the dividend component of a remaining second portion of the underlying assets. The systems and methods described herein may be utilized to implement many variation of component splits without departing from the scope hereof. As used herein, "ordinary" and "non-ordinary" do not have predefined meanings. For example, what is deemed to be an "ordinary" dividend and a "non-ordinary" dividend may be determined, for example, by the legal documents associated with the income and/or equity trusts issuing the units, Chicago Board Options Exchange ("CBOE"), etc. and the definition of "ordinary" and "non-ordinary" may therefore vary between differing applications of the present invention. As used herein, these terms are not intended to be limiting.

There are generally two forms of financial return related to investment products: i) growth through capital appreciation of the underlying investment, and ii) income through dividends or, in the case of fixed income securities, interest payments. Both are important parts of investment strategies. However, many investors have different investment utility (preference) for one or the other based on their need for current income or potential capital appreciation.

In general, equity investments in common stocks or stock indices typically provide a combination of both equity (growth) and income. However, depending on an investor's time horizon and goals, strategies that favor one over the other might be best suited. For example investors who have a very long time horizon are often more risk-tolerant and tend to need less current investment income for living expenses. By contrast, an investor in retirement may have greater need for current income and less need for long-term capital appreciation.

Traditional investing often requires an investor seeking more income to assume more risk in their portfolio through leverage, industry sector concentration, credit concentration, credit degradation or some combination of some or all of these. By contrast, investors seeking greater capital appreciation often assume greater risks either through sector concentration or via leverage provided either explicitly through margin or implicitly via options markets.

As depicted in FIG. 1A, traditional investing has long relied upon investment in assets 113 such as fixed income investments (such as notes and bonds), stocks including dividend paying stocks, indexes, and exchange traded funds. Yet the cash flows from these securities have not effectively been separated in the way that, for example, STRIPS in the 1980s separated the cash flows for bond investments. Thus regardless of the investment goals, both equity investors 110 (capital appreciation) and income investors 111 (dividend) have been required to buy traditional securities through a financial exchange 112 (e.g., the New York Stock Exchange, the National Association of Securities Dealers Automated Quotations Exchange ("Nasdaq®"), etc.). These securities can inherently carry growth or dividend risks that an investor might not want to assume. However, to date, these growth and income characteristics of finance exchange-traded securities have been locked together.

BRIEF SUMMARY OF THE INVENTION

Briefly stated, in one aspect of the present invention, a method of trading income and equity units is provided. This method includes the steps of: creating an equity trust for issuance of a plurality of equity units associated with the one or more underlying reference assets; creating an income trust for issuance of a plurality of income units associated with the one or more underlying reference assets; co-registering issuance of the equity units and the income units with one or more regulating entities; co-issuing the equity units and the income units via at least one creation agent, the equity units to be sold to a plurality of equity unit investors and the income units to be sold to a plurality of income unit investors, a combined price of the equity units and the income units being equivalent to a total value of the one or more underlying assets; purchasing the one or more underlying reference assets to be held by one or more global custodians; allocating, using a microprocessor, equity proceeds of a sale of the equity units to the equity trust; and allocating, using a microprocessor, income proceeds of a sale of the income units to the income trust.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1A depicts a schematic view of traditional investing as is known in the prior art;

FIG. 1B depicts a schematic view of a method of investing in accordance with embodiments of the present invention;

FIG. 5 depicts a flowchart of one method of segregating and distributing the value components of the equity and income units in accordance with the method and system shown in FIGS. 1B and 4A/4B;

FIG. 6A depicts a table of the potential investment results for investment in income and/or equity units;

FIG. 6B depicts a graph of an exemplary system showing various combinations of income and equity unit holdings and the investor's resulting capital leverage and dividend yield;

DETAILED DESCRIPTION OF THE INVENTION

Figure 2:
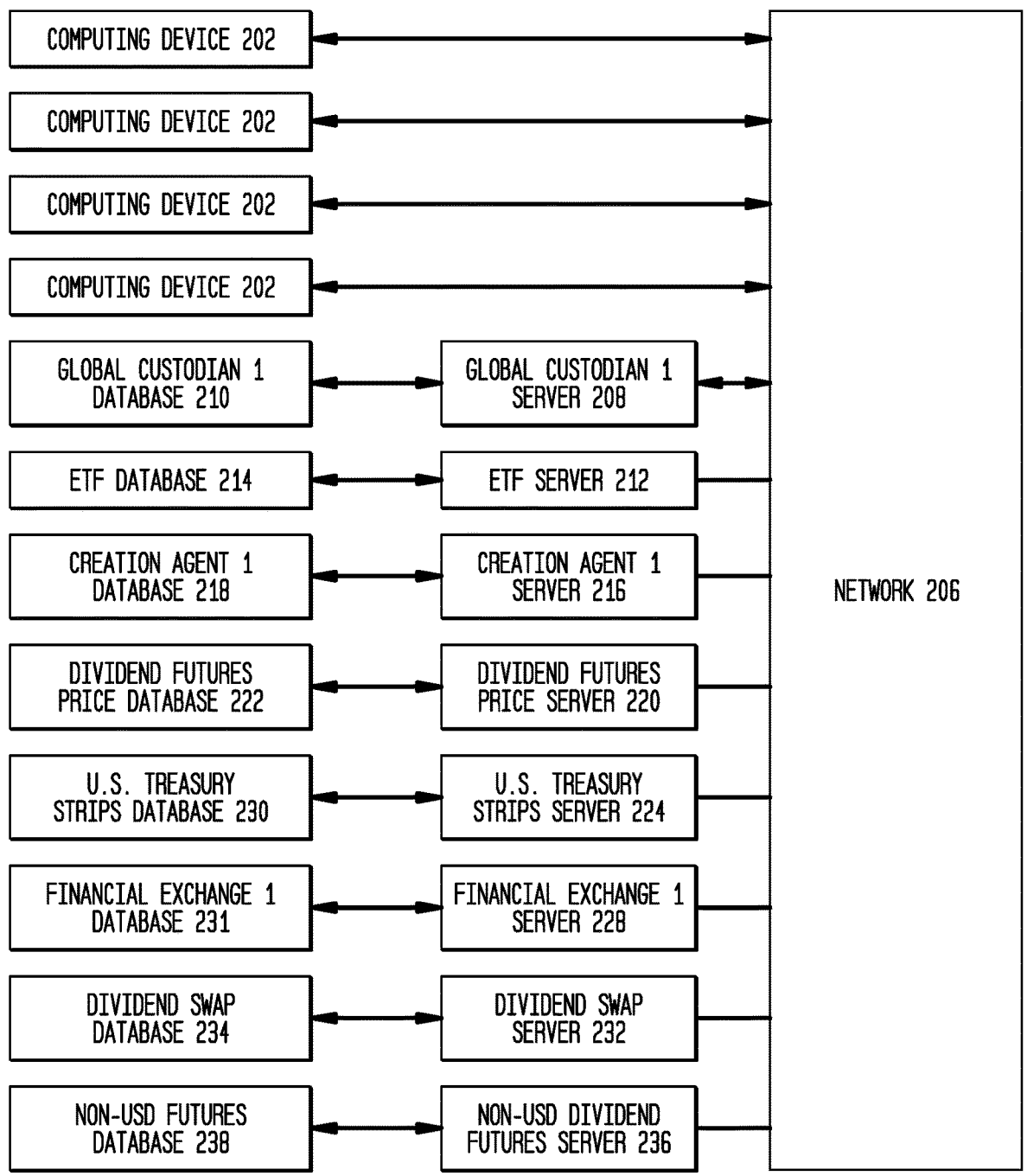
FIG. 2 depicts a schematic view of an exemplary network environment within which various embodiments of the present invention may be implemented.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a method" may include a plurality of methods. Thus, for example, a reference to "a method" may include one or more methods and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

A system and methodology by which certain identifiable aspects of the return of a portfolio of stocks, a stock index, or various combinations of certain equity or similar assets (each or collectively an "underlying reference asset") can be separated and traded as distinct components based on the preference of each buyer for the characteristics of each separate component. In one embodiment of the present invention, such a system will require the use of high-speed, microprocessor-based processes and methodologies for the proper dividend separation, fee and income allocations, cash distributions and trading of the component pieces such as those described herein. Additionally, a high-speed, microprocessor-based platform will be utilized to insure that the market trading price derived from the separation or re-combination of all these component pieces collectively will never differ materially from that of the value of the entire asset itself.

In one embodiment of the present invention, this computer-driven segregation process will not be based predominantly on the market price of the asset but rather on certain other aspects of the asset's performance. For example, an income unit or security may provide investors with quarterly ordinary cash dividend distributions of the underlying reference assets and an equity or capital or growth unit or security may entitle the holder to any and all capital appreciation/depreciation of the underlying reference and/or non-ordinary dividends but no ordinary cash dividends. Or, in some embodiments, the holders of the equity units will be entitled to some or all dividends after the income units have been fully redeemed. Equity units/securities and income units/securities are expected to trade independently based on their identified characteristics and the prevailing market demand for each. This provides each investor an opportunity to adjust his or her relative preference for income and equity based on the relative proportion of equity and income units the investor holds in his or her portfolio. Some exemplary portfolios are illustrated in FIG. 6B.

The present invention offers investors a means by which differing investment goals and return horizons can be realized by allowing them to separate, trade, hold or re-combine such equity and income units in response to varied investment needs. The present invention will allow each investor a far more precise way of selecting which component of an underlying asset to hold or discard. Via open market price discovery, these independently tradable units/securities will help an investor to better balance his or her income and equity needs against his or her risk tolerance.

Through the use of traditional investments, the present invention allows individual investors far greater flexibility to determine the relative proportion of income vs. capital appreciation/depreciation that best suits their needs, without the assumption of added risks that are currently necessary to achieve similar investment goals. Additionally, because multiple components of the underlying reference assets will be listed and traded separately, investors will have needed fluidity to rebalance these components in any proportion at any time to suit their investment needs.

Open market price discovery of each component of the underlying reference assets coupled with the ability to hold equity and income units on a one for one basis allows investors to trade units separately or to reconstitute one or more pairs of equity and income units to create an investment identical to that of the corresponding quantities of the underlying reference assets. Similar to certain Exchange Traded Funds ("ETFs"), certain dealers with a quantity of, for example, 50,000 equity units and an identical number of income units can redeem such for the value of the corresponding quantity of underlying reference assets.

Growth stocks typically pay far less of their earnings in the form of dividends and retain more of their earnings to fund corporate growth. Therefore, investors who have a shorter investment time horizon, are more risk averse, or require investment income to help meet expenses might favor stocks that pay a higher portion of earnings in the form of dividends. However, such a strategy of only purchasing higher dividend stocks (such as utilities, REITs or MLPs) can also expose these investors to sector concentration and lack of diversification. By contrast, investors trying to generate greater yield through margin also amplify the ups and downs of the financial exchange. Income units/securities could give income-sensitive investors another way to retain portfolio diversification while increasing income by agreeing to accept a smaller portion of any future capital appreciation/depreciation (by holding proportionally fewer equity units/securities).

In times when interest rates are low, investors who are reliant on interest payments may find it increasingly difficult to generate sufficient income to meet present needs and obligations. This can be particularly difficult for individuals who are retired and/or living solely on a fixed income. Additionally, most fixed income securities (excluding floating rate or inflation protected securities) generally do not allow for increases in prevailing rates of interest, and consequently their value may decline significantly in a rising interest rate or weakening corporate credit environment.

This need to generate income, especially when interest rates are at historic lows, has had several consequences. Investors may reach for additional income through investing in increasingly lower quality debt securities (i.e. high-yield bonds) and/or extending portfolio duration (and corresponding price risk) to capture greater income. For those who still want equity exposure, investment in dividend paying stocks may be an alternative, but the potential for capital loss may be unpalatable. The dividend yield on the benchmark S&P500 is just shy of 2%. While stock valuations are somewhat more unpredictable, stock dividends can often adjust upward in certain inflationary environments, partly allowing investors to preserve a larger portion of their purchasing power. It is anticipated that the equity units/ securities investors would absorb a large majority of the price volatility of the market as compared to investors seeking income via the income units/securities.

Unfortunately for some, an investment in dividend-paying equity securities requires buyers to assume more volatile change in stock price value. Decomposing the sources of return from a stock or an index and allowing these returns to trade separately would allow investors with unique risk/ reward, growth/income profiles to better achieve their investment goals.

The innovation proposed creates securities representing a system and a process by which the combination of two tradable securities is achieved, one representing the capital appreciation/depreciation component of a basket of stocks, or an index of stocks such as the S&P 500 Index (i.e., the equity units) and the other representing the ordinary dividend cash flows from that same portfolio for a fixed time period (e.g. 10 years) or until a fixed dollar amount of dividends has been received (e.g. $20 per income unit)(i.e., the income units). In some embodiments of the present invention, these equity and income units seek to track the performance of a basket of stocks or equity index(es) (e.g. Dow 30, S&P 500, or Nasdaq® 100 Index) before applicable fees. As heretofore mentioned, the equity and income units can be combined in any ratio in order to achieve target exposures to stock appreciation potential or dividend income, respectively. Given investors' varying return goals, equity and income units can be held in any combination that will result in the desired, unique potential risk/return outcomes The present invention includes a financial product cashflow management system that separates the capital appreciation component (equity/growth) and the dividend component (income) from one or more underlying reference assets. It allows an investor to replicate the price appreciation and dividends that are generated by a portfolio of underlying reference assets such as, without limitation, exchange traded equity-based securities or an equity index. This method and system may also include: portfolio securities re-adjustment processes to accommodate changes in index securities; processes for securing equity and income securities with licensing agreement(s); processes for offering multiple maturity levels with distinct cash flow assumptions; a dividend identification and sorting process to facilitate correct apportionment of cash flows between the holders of the equity and income units (e.g. ordinary dividends for income unit holders and non-ordinary dividends for equity unit holders); collection and distribution processes for cash/ non-cash dividends and subsequent distribution to unit holders; fee apportionment processes based on relative valuations of the equity and income units and/or quantities of such equity and income units; and/or processes for creation/ redemption of the equity and income units, which may be utilized by unit dealers to alter the supply of such units/ securities.

In one such embodiment of the present invention, the trusts who own the income and equity units will qualify as regulated investment companies under Subchapter M of the Internal Revenue Service Code ("RICs"). Consequently, the trusts generally will not be subject to U.S. federal income tax on income distributed in a timely manner to the holders of its units ("unitholders").

It is expected that market demand may significantly change the relative secondary trading values of the income units, the equity units, or both. Since the income units will pay monthly distributions based on the net dividends received by the income trust for the underlying reference assets, its trading can be expected to be affected by the actual dividends paid by companies whose stock is held jointly by the income and equity trusts, the expectation of the value of future dividends paid on such underlying reference assets, and the prevailing interest rates to each expected dividend date occurring prior to the expiration of the income and equity trusts.

Further, it is anticipated that equity units will be affected by changes in the value of the underlying reference assets and the relative demand and price of income units in the secondary market, among other factors. Holding all other variables constant, a drop in anticipated dividends until the income trust and equity trust expiration date can be expected to increase the trading price of the equity units relative to the income units. Conversely, holding all other variables constant, a rise in anticipated dividends until the income trust and equity trust expiration date can be expected to decrease the trading price of the equity units relative to the income units.

In one embodiment of the present invention, only certain institutional investors (typically market makers or other broker-dealers) are permitted to purchase or redeem income and equity units directly from the income and equity trusts, respectively, and they may do so only in excess of a predetermined minimum creation and/or redemption quantities (e.g., 10,000, 50,000, etc.).

Referring now to FIG. 2, depicted is an exemplary computing system environment for allowing a user of system 200 to perform the methods described herein. The depicted computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers ("PCs"), server computers, handheld or laptop devices, multi-processor systems, microprocessor-based systems, network PCs, minicomputers, mainframe computers, cell phones, tablets, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

In the depicted embodiment, exemplary system 200 includes, inter alia, one or more computing devices 202 and a plurality of servers including global custodian server 208, ETF server 212, creation agent server 216, dividend futures price server 220, U.S. Treasury STRIPS server 224, financial exchange server 228, dividend swap server 232, and non-USD dividend futures server 236. which interface to each other via network 206. Each of the depicted servers also have corresponding databases, namely, global custodian database 210, ETF database 214, creation agent 1 database 218, dividend futures price database 222, U.S. Treasury Strips database 230, Financial Exchange 1 database 231, dividend swap database 234, and non-USD futures database 238, respectively. The servers and databases shown in FIG. 2 are merely exemplary and servers and/or databases may be omitted or added without departing from the scope of the present invention. Further, one or more databases may be included in the respective server without departing from the scope hereof.

Figure 3:
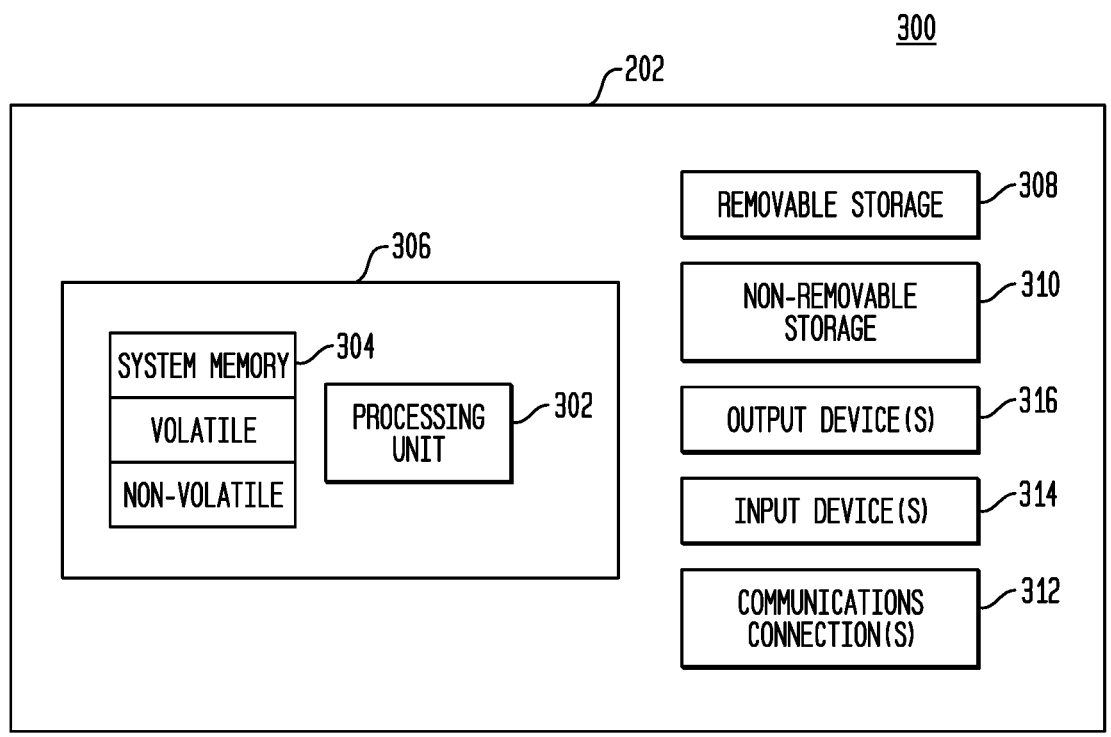
FIG. 3 depicts a block diagram of an exemplary computing device within which various embodiments of the present invention may be implemented.

In its most basic configuration, as depicted in FIG. 3, computing device 202 includes at least one processing unit 302 and at least one memory 304. Depending on the exact configuration and type of the computing device, memory 304 may be volatile (such as random access memory ("RAM")), non-volatile (such as read-only memory ("ROM"), flash memory, etc.), or some combination of the two. This most basic configuration is illustrated in FIG. 3 by dashed lines 306. In addition to that described herein, computing devices 202 can be any web-enabled handheld device (e.g., cell phone, smart phone, or the like) or personal computer including those operating via Android™, Apple®, and/or Windows® mobile or non-mobile operating systems.

Computing device 202 may have additional features/functionality. For example, computing device 202 may include additional storage (removable and/or non-removable) including, but not limited to, magnetic or optical disks or tape, thumb drives, and external hard drives as applicable. Such additional storage is illustrated in FIG. 3 by removable storage 308 and non-removable storage 310.

Computing device 202 typically includes or is provided with a variety of computer-readable media. Computer-readable media can be any available media that can be accessed by computing device 202 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 304, removable storage 308, and non-removable storage 310 are all examples of computer storage media. Computer storage media includes, but is not limited to, RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can accessed by computing device 202. Any such computer storage media may be part of computing device 202 as applicable.

Computing device 202 may also contain communications connection 312 that allows the device to communicate with other devices. Such communications connection 312 is an example of communication media. Communication media typically embodies computer-readable instructions, data structures, program modules and/or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency ("RF"), infrared and other wireless media. The term computer-readable media as used herein includes both storage media and communication media.

Computing device 202 may also have input device(s) 314 such as keyboard, mouse, pen, voice input device, touch input device, etc. Output device(s) 316 such as a display, speakers, printer, etc. may also be included. All these devices are generally known to the relevant public and therefore need not be discussed in any detail herein except as provided.

Notably, referring back to FIG. 2, computing device 202 is one of a plurality of computing devices 202 inter-connected by network 206. As may be appreciated, network 206 may be any appropriate network and each computing device 202 may be connected thereto by way of connection 312 in any appropriate manner, and each computing device 202 may communicate with one or more of the other computing devices 202 via network 206 in any appropriate manner. For example, network 206 may be a wired network, wireless network, or a combination thereof within an organization or home or the like, and may include a direct or indirect coupling to an external network such as the Internet or the like. Likewise, network 206 may be such an external network including, without limitation, the Internet. In the exemplary embodiments shown herein, network 206 is the Internet and allows the multiple systems necessary to implement the systems and methods discussed herein to communicate data quickly and efficiently. However, alternate networks and/or methods of communicating information may be substituted without departing from the scope hereof.

Computing device 202 may connect to the various servers via such an internal or external network. Although FIG. 2 depicts computing device 202 located in close proximity to the servers, this depiction is not intended to define any geographic boundaries. For example, when network 206 is the Internet, computing device can have any physical location. For example, computing device may be a tablet, cell phone, personal computer, or the like located at any user's office, home, etc. Or computing device could be located proximate to one or more servers without departing from the scope hereof. Also, although FIG. 2 depicts computing devices 202 coupled to the servers via network 206, computing devices may be coupled directly to one or more servers via any other compatible networks including, without limitation, an intranet, local area network, or the like.

The depicted embodiment of system 200 uses a standard client server technology architecture, which allows users of system 200 to access information stored in the relational databases via custom user interfaces. In some embodiments of the present invention, the processes are hosted on one or more servers which are accessible via the Internet using a publically addressable Uniform Resource Locator ("URL"). For example, users can access exemplary system 200 using any web-enabled device equipped with a web browser. Communication between software component and sub-systems are achieved by a combination of direct function calls, publish and subscribe mechanisms, stored procedures, and direct SQL queries, however, alternate components, methods, and/or sub-systems may be substituted without departing from the scope hereof. Also, alternate embodiments are envisioned in which a computing device 202 directly accesses one or more servers through a private network rather than via the Internet and a URL.

Computing devices 202 may be equipped with one or more Web browsers to allow them to interact with one or more servers and/or databases via a HyperText Transfer Protocol ("HTTP"). HTTP functions as a request-response protocol in client-server computing. For example, a web browser operating on computing device 202 may execute a client application that allows it to interact with applications executed by the one or more servers. The client application submits HTTP request messages to the one or more servers. The corresponding servers, which provide resources such as HTML files and other data or content, or performs other functions on behalf of the client application, returns a response message to the client application upon request. The response typically contains completion status information about the request as well as the requested content. However, alternate methods of computing device/server communications may be substituted without departing from the scope hereof including those that do not utilize the Internet for communications.

In the exemplary system 200, the databases may include a plurality of databases and/or database tables. As may be appreciated, the databases may be any appropriate database capable of storing data and may be included within or connected to one or more servers similar to those described herein in any appropriate manner without departing from the scope hereof.

It should be understood that the various techniques described herein may be implemented in connection with hardware or software or, as appropriate, with a combination of both. Thus, the methods and apparatus of the presently disclosed subject matter, or certain aspects or portions thereof, may take the form of program code (i.e., instructions, scripts, and the like) embodied in tangible media, such as floppy diskettes, CD-ROMs, hard drives, flash drives, DVDs or any other machine-readable storage medium wherein, when the program code is loaded into and executed by a machine, such as a computer, the machine becomes an apparatus for practicing the presently disclosed subject matter.

In the case of program code execution on programmable computers, the interface unit generally includes a processor, a storage medium readable by the processor (including volatile and non-volatile memory and/or storage elements), at least one input device, and at least one output device. One or more programs may implement or utilize the processes described in connection with the presently disclosed subject matter (e.g., through the use of an application-program interface ("API"), reusable controls, or the like). Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as system 200 or a distributed computing environment. Still further, aspects of the presently disclosed subject matter may be implemented in or across a plurality of processing chips or devices, and storage may similarly be affected across a plurality of devices in system 200. Such devices might include personal computers, network servers, and handheld devices (e.g., cell phones, tablets, smartphones, etc.), for example.

In the exemplary embodiment, one or more servers and its associated databases are programmed to execute a plurality of processes including those discussed in greater detail herein.

Turning now to FIG. 1B, depicted is a schematic view of a method of investing in accordance with one embodiment of the present invention that may operate in conjunction with some or all of the aspects of the embodiment of the present invention shown in FIGS. 2 through 15 or may operate as a standalone method without departing from the scope hereof. The embodiment of the present invention shown in FIGS. 1B through 15 seeks to unlock the growth/equity and income characteristics of traditional securities (as shown in FIG. 1A) by allowing pure capital appreciation investing through the purchase of equity units 114 and pure cash dividend income investing through the purchase of income units 115. In the depicted embodiment, the equity units 114 and the income units 115 are separately traded instruments available via a traditional financial exchange 112, however, alternate embodiments are envisioned in which such units are traded separately from a financial exchange such as financial exchange 112 or they trade on multiple exchange(s) without departing from the scope hereof.

Figure 4A:
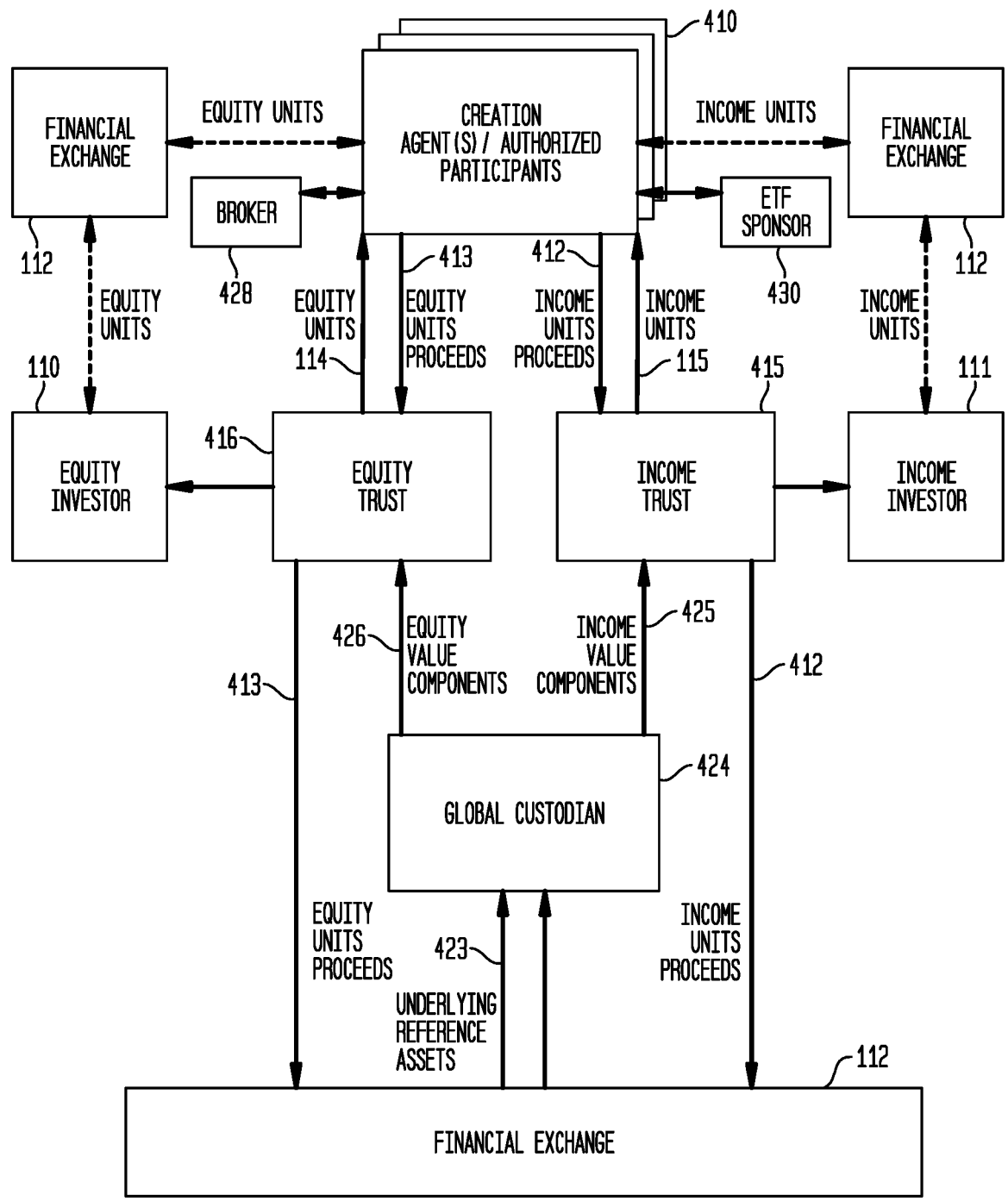
FIG. 4A depicts an exemplary system for providing equity and income value components (units) of one or more stocks to investors in accordance with one embodiment of the present invention.

Referring now to FIG. 4A, depicted is one system for achieving the goals set forth in FIG. 1B as described above. This method separately provides dividend and capital components of one or more stocks to investors in accordance with one embodiment of the present invention. As also described above, the system provides the ability to separate certain dividends for a fixed period of time (or until a fixed amount is paid out or received) from the appreciation component of one or more stocks (i.e., a common stock, a basket of common stocks, an index of common stocks or management investment company(s)). These one or more stocks are referred to herein as the underlying reference asset(s) 423.

In the embodiment of the present invention depicted in FIG. 4A, separately tradable financial instruments are created that segregate the income value components 425 (e.g., ordinary cash dividend flows) from the equity value components 426 of the underlying reference assets 423 (e.g., capital appreciation/depreciation, non-ordinary dividends, etc.). This allows investors the ability to invest specifically in either the income-producing or capital-appreciation components of such underlying reference assets 423. In this manner, an investor is able to specifically invest in only the desired portion of a security's return. That is, income units 115 may represent a variable annuity of, for example, ordinary dividends for a fixed period of time (or until a fixed amount is paid out or received). Conversely, equity units 114 may represent, for example, the asset's appreciation/depreciation and non-ordinary dividends during the life of the corresponding income and equity units. Both units may be registered and listed as securities on a traditional financial exchange 112 and will trade at prevailing market prices for a predetermined period of time. However, alternate embodiments of the present invention are envisioned that include different ways to split the income and equity components of the underlying reference assets. For example, in an alternate embodiment, equity units 114 represent the asset's appreciation/depreciation only during the life of the corresponding income and equity units and income units 115 represent all ordinary and non-ordinary cash and stock dividends.

In the embodiment of the invention depicted in FIG. 4A, two separate investment companies 415 and 416 are utilized in addition to one or more creation agents 410 (also known as Authorized Participants), a broker 428, an ETF sponsor 430, and a global custodian 424. Although a single global custodian is shown, alternate embodiments are envisioned in which a pair of global custodians or a differing quantity of global custodians are substituted to perform the functions of global custodian 424 as described herein.

In the depicted embodiment, the ETF sponsor 430 is a company, financial institution, or the like which creates and administers an Exchange Traded Fund ("ETF"), broker 428 is an individual or firm that charges a fee or commission for executing buy and sell orders submitted to it by an investor, and the creation agents 410 are typically large institutional organizations such as market makers including, without limitation, NYSE specialists and NASDAQ® market makers. ETF sponsor 430 is responsible for selecting one or more creation agents 410 to obtain the underlying reference assets needed to create an ETF. This is typically done via execution of a legal agreement between the ETF sponsor 430 and the one or more creation agents 410.

Global custodian 424 holds the underlying reference assets 423, respectively, for the ownership thereof by the equity and income trusts 416 and 415, respectively. The global custodian 424 tracks the timing and nature of all value components including income value components 425 (e.g., ordinary dividends) and equity value components 426 (e.g., non-ordinary dividends and stock appreciation/depreciation) for the underlying reference assets 423 to the equity and income trusts 416 and 415, respectively.

Also, in the depicted embodiment, the investment companies 415 and 416 share in the underlying reference assets 423 held by the global custodian 424 based on predetermined rules. For example, the investment companies may each execute a joint custodial agreement with the global custodian 424. This allows the value components to flow to the two independent investment companies 415 and 416 in a manner determined by the global custodian 424 in accordance to predetermined apportionment rules utilizing processes such as those shown and described in greater detail herein. Such processes may operate in a computer environment such as that described above with respect to FIGS. 2 and 3 as discussed in greater detail herein. Although two trusts 415 and 416 are depicted, alternate embodiments are envisioned in which a single trust issues both income and equity units without departing from the scope hereof.

In the embodiment depicted in FIG. 4A, the creation agent 410 is specifically authorized and possibly certified by the ETF sponsor 430 to create both the income units 415 and the equity units 414. The creation agent 410 will create (and redeem) all income units 415 and equity units 414 in equal proportion, thus ensuring that the corresponding portions of a single financial instrument can be recombined to represent the total economic ownership of the underlying reference asset(s) 423. Although only one creation agent 410 is depicted in FIG. 4A, additional or varying creation agents and/or independent third parties may also be authorized or substituted.

Although income and equity units will be created in equal quantities, the ultimate owners of the income and equity units do not have to hold the units in equal quantities. The income investors 111 are free to invest in any quantity of income units 415 regardless of the quantity of corresponding equity units 414 that are in existence. Similarly, the equity investors 110 are free to invest in any quantity of equity units 414 regardless of the quantity of corresponding income units 415 that are in existence. Both the income and equity units 415 and 414, respectively, will be traded independently on one or more financial exchanges 112. This allows investors investing in the units of the present invention the unique ability to obtain investor-concentrated exposure to either equity/growth or income depending on the number of income and/or equity units held. This concentration is achieved through the process of splitting value components such as equity and income value components 426 and 425, respectively, and, thus, does not require traditional use of leverage, such as broker margin.

As depicted in FIG. 4A, two investment companies are shown, namely the equity trust 416 and the income trust 415. For example, two investment companies may be used to allow a first investment company to issue shares for the capital appreciation/equity portion of the underlying reference assets 423 (referred to in FIG. 4A as the equity units 414) and to allow a second investment company to issue shares for the dividend/income portion of the underlying reference assets 423 (referred to in FIG. 4A as the income units 415).

Further, the formation of at least two investment companies allows the income and equity value components 425 and 426, respectively, of the underlying reference assets 423 to be properly collected and distributed to the corresponding income and equity investment companies, respectively, thereby allowing "dual" ownership of the underlying reference assets. In the depicted embodiment of the present invention, the investment companies seek to achieve their investment objective by holding a portfolio of the securities or other assets that are included in the underlying reference assets 423 with the weight of each security or asset in the portfolio corresponding to the weight of the security or asset in the corresponding financial index. However, alternate methods of selecting underlying reference assets 423 may be substituted without departing from the scope hereof. Similarly, although two investments companies are shown, alternate quantities may be substituted.

In the depicted embodiment, each of the two investment companies registers its shares with the appropriate government authorities, if any (e.g., the Securities and Exchange Commission ("SEC")) for sale to the public (via the creation agent 410) and sells its shares contemporaneously and in equal share amounts with the other investment company via a co-registration statement filed with all necessary governmental authorities, for example, in the U.S., the SEC and the Commodities Futures Trading Commission ("CFTC"). Such a co-registration statement may be filed, for example, in accordance with the Securities Act of 1933. In this manner, multiple companies are utilized to issue shares that each represent a portion of the underlying reference assets 423. Collectively, the multiple issuing companies will purchase the underlying reference assets 423 and have claim to all of the economic interests thereto (with the exception of custodial fees and expenses). Further, once the equity and income units are jointly created, application will be made to trade the units separately on a financial exchange such as financial exchange 112.

In some embodiments of the present invention, equity and income trusts 416 and 415, respectively, may seek the issuance of a No-Action Letter granting relief from Sections 17(*a*) and 17(*d*) of the Investment Company Act of 1940 (the "'40 Act"). If such a No-Action Letter is issued, two separate but affiliated funds such as equity and income trusts 416 and 415, respectively, will be able to share portions of the economics of the same set of assets without the need for one trust to sell a portion of the underlying reference assets 423 (e.g., dividend futures or dividend swaps) to the other trust through a futures exchange, swap market, or the like in order to maintain the separation required by the '40 Act (one exemplary system and method for implementing the present invention when a No Action Letter has not been issued are described herein with respect to FIGS. 4B and 14). Further, the issuance of such a No-Action Letter will allow two separate but affiliated funds such as equity and income trusts 416 and 415, respectively, to hold the same underlying reference assets in joint rather than segregated custody, or to directly exchange portions of the underlying reference assets with each other, as each fund is entitled to different parts of the same underlying reference assets as shown in FIG. 4A.

Although in the depicted embodiment, two or more separate investment companies may issue (or create) shares of each company on a one for one basis for the cash value of the underlying reference assets 423, this is not required to implement the present invention. Additionally, although shares of each of the separate companies may be tendered in equal share amounts, and may be redeemed for the cash value of the underlying reference assets 423, this is not required to implement the present invention.

Figure 13A:
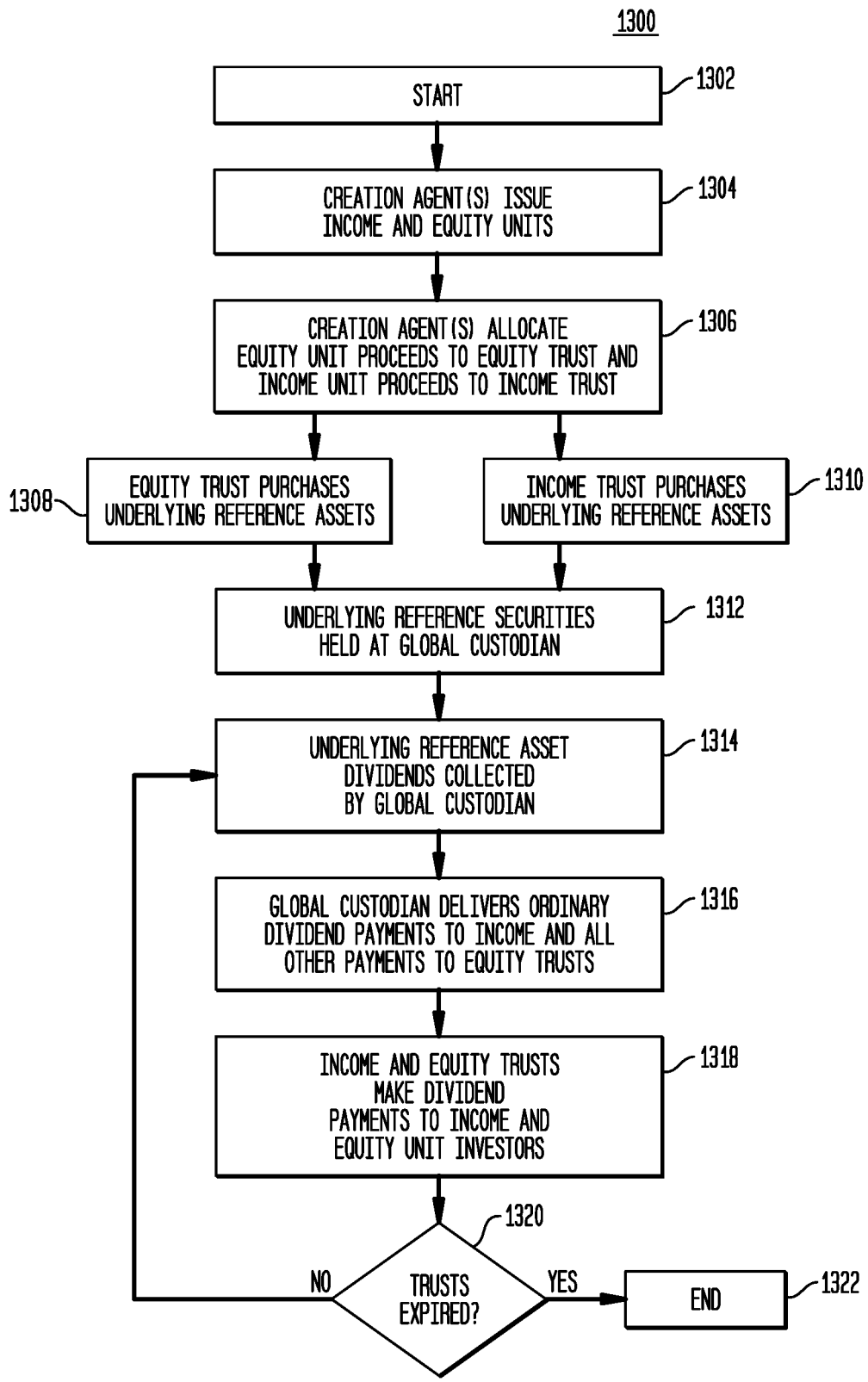
FIG. 13A depicts an exemplary process for creating income and equity units in accordance with one embodiment of the present invention.

Referring now to FIG. 13A, depicted is one process 1300 of utilizing a system such as the system of FIG. 4A to issue income and equity units in accordance with one embodiment of the present invention. Such a process may be utilized, for example, if a No Action Letter has been issued granting relief from Sections 17(*a*) and 17(*d*) of the '40 Act as discussed in greater detail above, thereby allowing two affiliated entities to do business with each other.

Process 1300 begins at 1302, at which one or more entities (e.g., creation agents) wish to issue new income and equity units. Next, at 1304, the creation agent 410 issues income units 115 on behalf of the income trust 415 while simultaneously issuing equity units 114 on behalf of the equity trust 416 for purchase by the income and equity investors 111 and 110, respectively, via a financial exchange such as financial exchange 112. It should be noted that although investors are referred to in FIG. 4A as income or equity investors, any individual investor may be both an income investor 111 and an equity investor 110 without departing from the scope hereof.

Process 1300 then proceeds to 1306, at which the proceeds generated from the sale of the income and equity units, i.e., the income unit proceeds 412 and equity unit proceeds 413 (collectively unit proceeds) are allocated to their respective income trust 415 and equity trust 416, respectively.

After the income and equity trusts 415 and 416, respectively, receive the income unit proceeds 412 and the equity unit proceeds 413, process 1300 proceeds to steps 1308 and 1310. At step 1308, the equity trust uses its portion of the unit proceeds to purchase a corresponding percentage of the underlying reference assets. Similarly, at step 1310, the income trust uses its portion of the unit proceeds to purchase a corresponding percentage of the underlying reference assets. Such assets may be purchased via a financial exchange such as financial exchange 112 (FIG. 4A) or an alternate financial exchange without departing from the scope of the present invention.

Next, at step 1312, the underlying reference assets 423 purchased in steps 1308 and 1310 are subsequently held at a global custodian 424 under an agreement between the global custodian 424 and the equity and income trusts 416 and 415, respectively, for the benefit of the trusts. In one embodiment of the present invention, the agreement is a shared custody agreement, however, alternate agreements may be substituted without departing from the scope hereof.

In the depicted embodiment of the present invention, the equity and income trusts each only own a portion of the total underlying reference assets. However, as described in greater detail herein, in the depicted embodiment of the present invention, it is intended that the equity trust owns 100% of the capital appreciation/depreciation of the underlying reference assets and 100% of all non-ordinary dividends associated with the underlying reference assets and the income trust owns 100% of the ordinary dividends of the underlying reference assets. Therefore, in the depicted embodiment, the equity trust transfers all ordinary dividends for its percentage of the underlying reference assets to the income trust in exchange for the appreciation/depreciation and non-ordinary dividends associated with its portion of the underlying reference assets. For example, if 80% of the total unit proceeds are allocated to the equity trust and 20% of the total unit proceeds are allocated to the income trust, the equity trust transfers all ordinary dividends for its 80% of the underlying reference assets to the income trust in exchange for the appreciation/depreciation and non-ordinary dividends associated with the income trust's 20% of the underlying reference assets.

Next, at step 1314, the global custodian 424 collects all dividends issued for the underlying reference assets 423. The global custodian 424 records such dividends and allocates the dividends to the income and equity trusts in accordance with the shared custody agreement and/or the rules set forth upon issuance of the income and equity units. Processes such as those described herein may be utilized for performing these functions.

Thereafter, all income value components 425 will be allocated to income trust 415 and all equity value components 426 shall be allocated to equity trust 416 for the duration of the trusts (for example, for a period of ten (10) years). In the depicted embodiment, income value components 425 include ordinary dividends and equity value components 426 include all non-ordinary dividends and any appreciation/depreciation of the underlying reference assets 423, however, alternate methods of splitting dividends and equity between the income and equity value components may be substituted without departing from the present invention.

Next, at step 1318, the income and equity trusts 415 and 416, respectively, apportion any necessary fees to the income and equity unit owners and thereafter issue the appropriate dividend payments to such income and equity investors 111 and 110, respectively. Methods of making such payments are illustrated and described herein in greater detail.

Process 1300 then proceeds to 1320, at which it determines whether the trusts have expired. If yes, process 1300 proceeds to 1322 at which it ends. If the trusts have not expired, process 1300 returns to 1314 at which it waits until new dividends are received by the global custodian for processing. At such time, steps 1314 through 1320 are repeated.

It is worth noting that once income and equity units have been created and traded on a financial exchange, their prices are determined by market forces as is the case for any other exchange-traded security. Although a single equity unit and its corresponding income unit represent the economic interest in one unit of the corresponding underlying reference asset 423, a myriad of factors may influence individual equity and income unit prices in a financial exchange.

It is also the prerogative of creation agent 410 to hold either or both types of units for any reason (i.e., to not offer a portion or all of either unit for sale). Although both income and equity units 415 and 414, respectively, represent an ownership position in the underlying reference asset 423, the price of the two units combined (i.e., the income and equity units) may from time to time diverge from the fair market value of the underlying reference asset based on conditions including, but not limited to: market supply/demand characteristics; investor utility; tax preference, and overall financial market conditions.

Figure 4B:
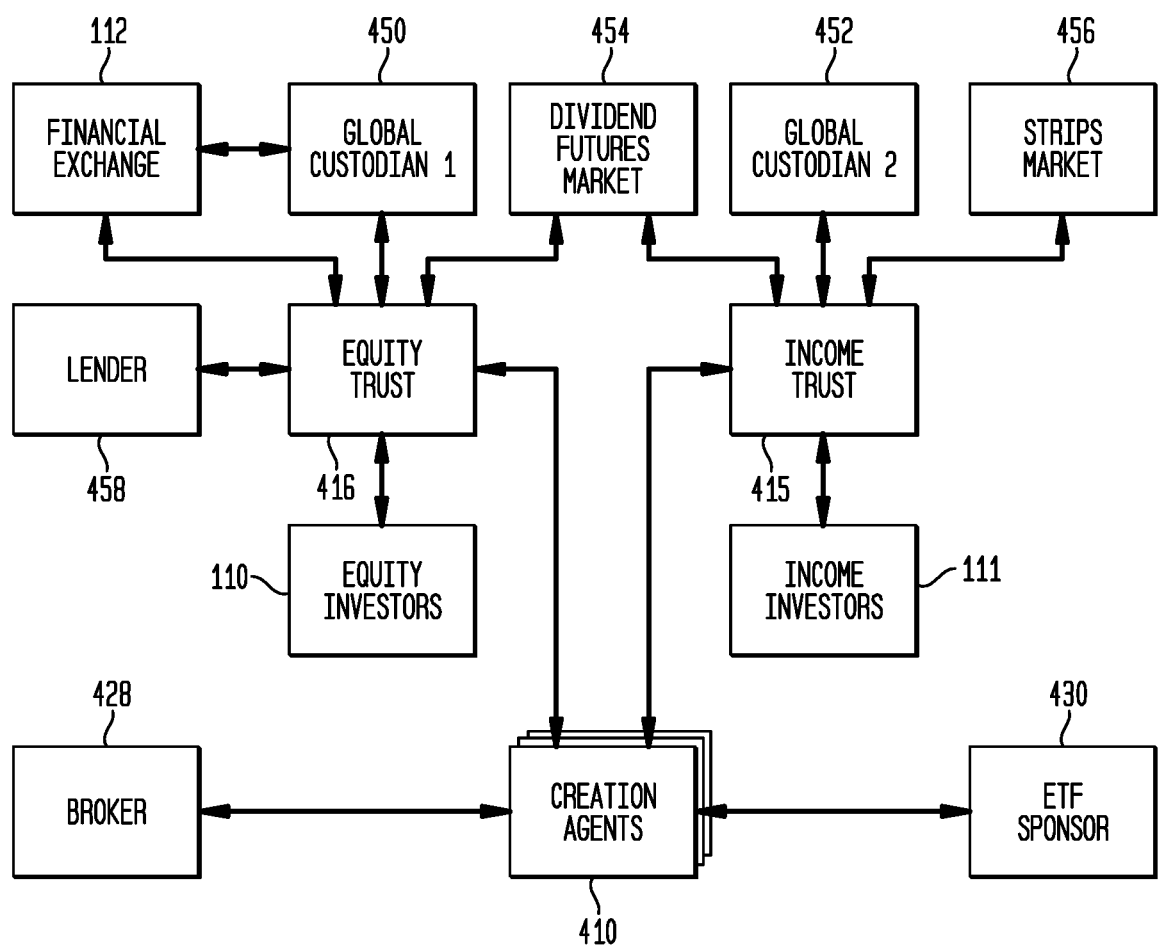
FIG. 4B depicts an exemplary system for providing equity and income value components (units) of one or more stocks to investors in accordance with one alternate embodiment of the present invention.

Turning now to FIG. 4B, depicted is one alternate system for achieving the goals set forth in FIG. 1B as described above. This method also separately provides dividend and capital components of one or more stocks to investors in accordance with one alternate embodiment of the present invention. As also described above, the system provides the ability to separate certain dividends for a fixed period of time (or until a fixed amount is paid out or received) from the appreciation component of one or more stocks (i.e., a common stock, a basket of common stocks, an index of common stocks or management investment company(s)).

In the embodiment of the present invention depicted in FIG. 4B, separately tradable financial instruments are created that segregate the income value components 425 (e.g., ordinary cash dividend flows) from the equity value components 426 of the underlying reference assets 423. This allows investors the ability to invest specifically in either the income-producing or capital-appreciation components of such underlying reference assets. In this manner, an investor is able to specifically invest in only the desired portion of a security's return. That is, income units 115 may represent a variable annuity of, for example, ordinary dividends for a fixed period of time (or until a fixed amount is paid out or received). Conversely, equity units 114 may represent, for example, the asset's appreciation/depreciation and non-ordinary dividends during the life of the corresponding income and equity units. Both units may be registered and listed as securities on a traditional financial exchange 112 and will trade at prevailing market prices for a predetermined period of time. However, alternate embodiments of the present invention are envisioned that include different ways to split the income and equity components of the underlying reference assets. For example, in an alternate embodiment, equity units 114 represent the asset's appreciation/depreciation only during the life of the corresponding income and equity units and income units 115 represent all ordinary and non-ordinary cash and stock dividends.

In the embodiment of the invention depicted in FIG. 4B, two separate investment companies 415 and 416 are utilized in addition to one or more creation agents 410 (also known as Authorized Participants), a broker 428, an ETF sponsor 430, a pair of global custodians 450 and 452, a lender 458.

In the depicted embodiment, the ETF sponsor 430, the broker 428, and the creation agents 410 are as discussed above with respect to FIG. 4A. Lender 458 is a bank or other entity capable of lending money to the equity trust 416.

In the depicted embodiment, each of the income and equity trusts has a dedicated global custodian to maintain independence of the trusts. Specifically, global custodian 450 holds the underlying reference assets of equity trust 416 and global custodian 452 holds the underlying reference assets of income trust 415 for the ownership of the respective trusts. The global custodians 450 and 452 track the timing and nature of all value components including the income value components (e.g., ordinary dividends) and the equity value components (e.g., non-ordinary dividends and stock appreciation/depreciation) for the underlying reference assets 460 and 462 to the equity and income trusts 416 and 415, respectively.

In the embodiment depicted in FIG. 4B, the creation agent 410 is specifically authorized and possibly certified by the ETF Sponsor 430 to create both the income units 415 and the equity units 414. The creation agent 410 will create (and redeem) all income units 415 and equity units 414 in equal proportion, thus ensuring that the corresponding portions of a single financial instrument can be recombined to represent the total economic ownership of the underlying reference asset(s). Although only one creation agent 410 is depicted in FIG. 4B, additional or varying creation agents and/or independent third parties may also be authorized or substituted.

As depicted in FIG. 4B, two investment companies are shown, namely the equity trust 416 and the income trust 415. For example, two investment companies may be used to allow a first investment company to issue shares for the capital appreciation/equity portion of the underlying reference assets (referred to in FIG. 4B as the equity units 114) and to allow a second investment company to issue shares for the dividend/income portion of the underlying reference assets (referred to in FIG. 4B as the income units 115).

In the depicted embodiment, each of the two investment companies registers its shares with the SEC for sale to the public (via the creation agent 410) and sells its shares contemporaneously and in equal share amounts with the other investment company via a co-registration statement filed with all necessary authorities including, without limitation, the SEC and the CFTC. Such a co-registration statement may be filed in accordance, for example, with the Securities Act of 1933. In this manner, multiple companies are utilized to issue shares that each represent a portion of the underlying reference assets. Further, once the equity and income units are jointly created, application will be made to trade the units separately on a financial exchange such as financial exchange 112.

Figure 14:
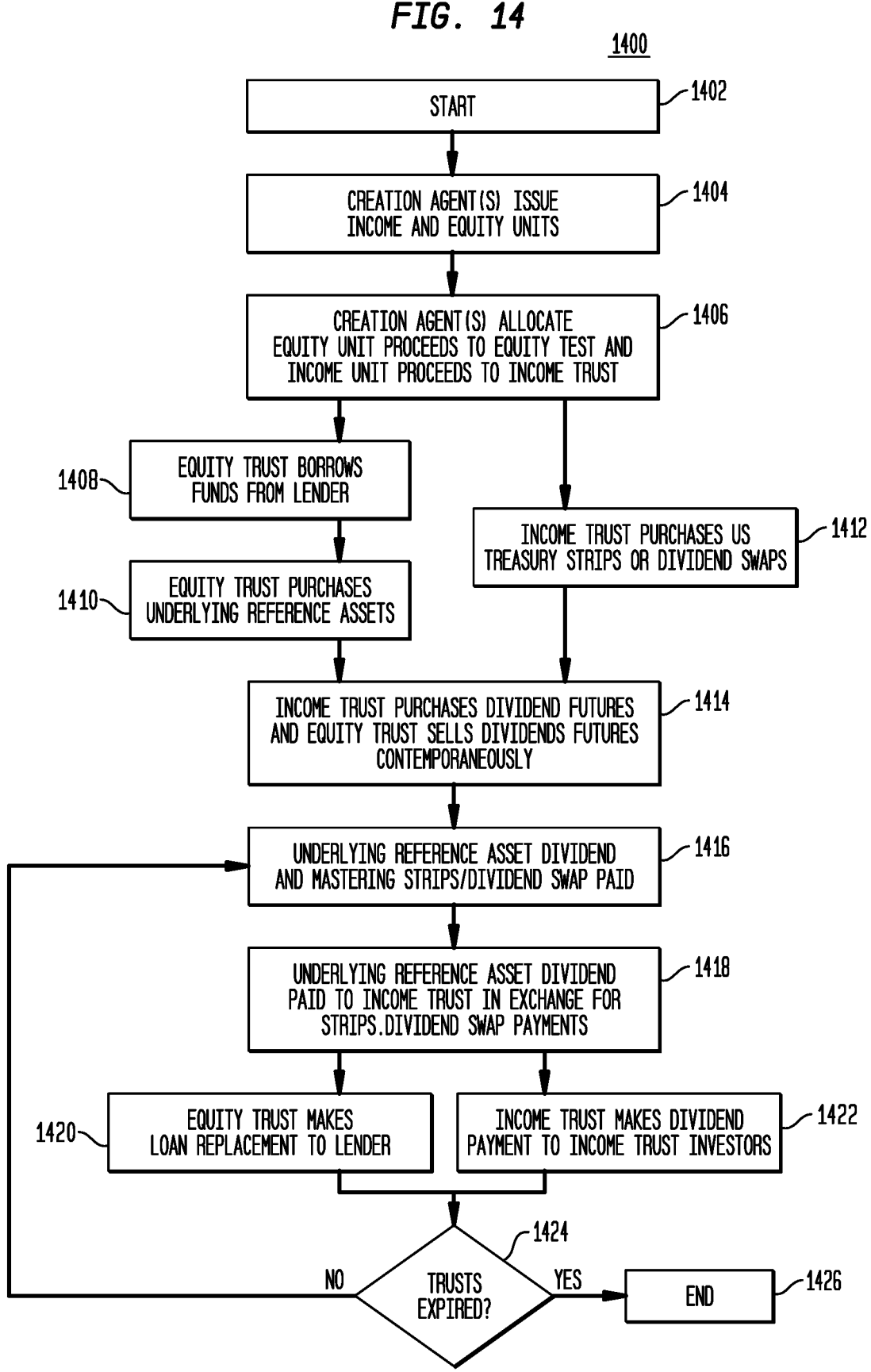
FIG. 14 depicts an exemplary process for creating income and equity units in accordance with one alternate embodiment of the present invention.

Referring now to FIG. 14, depicted is one process 1400 of utilizing a system such as that shown in FIG. 4B to issue income and equity units in accordance with one embodiment of the present invention. Such a process may be utilized, for example, if a No Action Letter has not been issued granting relief from Sections 17(*a*) and 17(*d*) of the '40 Act as discussed in greater detail above, thereby requiring that the affiliated entities (e.g., the income and equity trust) do not transact business with each other.

Process 1400 begins at 1402, at which one or more parties wish to issue new income and equity units. Next, at 1404, the creation agent 410 issues income units 115 on behalf of the income trust 415 while simultaneously issuing equity units 114 on behalf of the equity trust 416 for purchase by the income and equity investors 111 and 110, respectively, via a financial exchange such as financial exchange 112. It should be noted that although investors are referred to in FIG. 4B as income or equity investors, any individual investor may be both an income investor 111 and an equity investor 110 without departing from the scope hereof.

Process 1400 then proceeds to 1406, at which the proceeds generated from the sale of the income and equity units, i.e., the income unit proceeds and equity unit proceeds (collectively unit proceeds) are allocated to their respective income trust 415 and equity trust 416, respectively. For exemplary purposes, we will assume that 80% of the total unit proceeds are allocated to the equity trust (i.e., the equity unit proceeds) and 20% of the total unit proceeds are allocated to the income trust (i.e., the income unit proceeds).

After the income and equity trusts 415 and 416, respectively, receive the income unit proceeds and the equity unit proceeds, respectively, process 1400 proceeds to steps 1408, 1410, and 1412. At step 1408, the equity trust borrows an amount of money required to purchase 100% of the underlying reference assets. That is, since the income and equity units are sold in step 1404 for a value equivalent to the value of the underlying reference assets associated with the income and equity units, and since a portion of this collected value is allocated to the income trust at step 1406 (e.g., 20%), the portion of the total unit proceeds allocated to the equity trust is less than the cost of the underlying reference assets (in our example, 20% less than the cost of the underlying reference assets). Therefore, if the equity trust wishes to purchase 100% of the underlying reference assets, it must borrow the shortfall between the cost of such assets and the amount of the equity unit proceeds allocated to it by the creation agent(s) 410. This loan is instituted at step 1408, at which the amount of the shortfall is borrowed by the equity trust 1416 from a lender 458. Next, at 1410, the equity trust utilizes the proceeds from sale of the equity units and the money borrowed from lender 458 to purchase 100% of the underlying reference assets, which will be held for the equity trust 416 by its global custodian 450.

Simultaneously, at step 1412, the income trust uses its portion of the total unit proceeds to purchase a quantity of U.S. Treasury Strips or Dividend Swaps, which will provide a return that is equivalent to the loan payments to be made by the equity trust for the loan undertaken in step 1408. Such assets may be purchased, for example, via a Strips Market 456 and are held by the global custodian 452 associated with the income trust 415.

Next, at step 1414, the equity trust 416 sells dividend futures associated with the underlying reference assets to a Dividend Futures Market 454 such as, but not limited to, CME, LIFFE, and Eurex. Contemporaneously, the income trust purchases the dividend futures contracts associated with the underlying reference assets and such contracts are also held by the global custodian 452 associated with the income trust 415. In this manner, both the income and equity trusts hold an interest in the underlying reference assets purchased by the equity trust in association with the issued income and equity units.

Process 1400 then proceeds to 1416, at which dividends are paid to the equity trust 416 for the underlying reference assets and maturing STRIPS are paid to the income trust 415. Next, at 1418, the dividends paid to the equity trust 416 are paid to the income trust 415 in accordance with the dividend futures contract. In exchange, the income trust 415 utilizes its STRIPS payment to pay the cost of the dividend futures contract to the equity trust 416.

Process 1400 then proceeds to 1420 and 1422. At 1420, equity trust 416 utilizes the STRIPS payment received from the income trust 415 to repay its loan obligation to Lender 458. At 1422, income trust 415 utilizes the dividend payments received from the equity trust under the dividend futures contract to pay dividends to the holders of the income units.

Process 1400 then proceeds to 1424, at which it determines whether the trusts have expired. If yes, process 1400 proceeds to 1426 at which it ends. If the trusts have not expired, process 1400 returns to 1416 at which it waits until new dividends are issued for the underlying reference assets and/or new STRIPS have reached maturity. At such time, steps 1416 through 1424 are repeated.

At the time of the termination of the income and equity trusts, the underlying reference assets held at the global custodian 450 of the equity trust 416 will be owned solely by the equity trust 416 and confirmed by the ETF sponsor database. Also, upon termination, the income units will cease to exist and will no longer trade on any financial market. At this point, income unit investors will have received all appropriate cash flows and thus the income trusts 415 will have no claim to the underlying reference assets held by global custodian 450 of the equity trust 416. These underlying reference assets will be liquidated in a financial exchange such as financial exchange 112 after termination of the trusts.

Turning next to FIG. 5, depicted is one method of segregating and distributing the cash flows and/or value components of underlying reference assets such as underlying reference assets 423. As discussed above, these value components may include, without limitation: ordinary cash dividends, non-ordinary cash dividends, non-cash dividends, and asset appreciation and depreciation. In the depicted embodiment, the income value components 425 received by the income trust 415 will include ordinary cash dividends for a specified duration of time (e.g., ten (10) years in the depicted embodiment which is the duration/life of the income trust) only. However, alternate embodiments of the present invention are envisioned in which the income value components 425 include additional components including, without limitation, a percentage of the asset appreciation/depreciation, non-ordinary cash dividends, etc. without departing from the scope hereof. Also, although the depicted embodiment includes trusts having an initial duration of ten (10) years, alternate time periods may be substituted without departing from the scope hereof. In one embodiment, the duration of the trusts are not predefined but rather terminate upon the occurrence of an event. Or, the trusts may have no termination date.

In the depicted embodiment, the equity value components 426 received by the equity trust 416 will include all value components not owned by the income trust 415. In the depicted embodiment, these value components include non-ordinary dividends and all capital appreciation/depreciation of the underlying reference assets 423. However, alternate embodiments of the present invention are envisioned in which the equity value components include additional or lesser components than those depicted in FIG. 5. In the depicted embodiment, the equity units shall terminate at the time the income units mature, however, alternate embodiments are envisioned with differing termination dates.

Since, in the depicted embodiment, income and equity units are created in equal quantities, both an income unit and an equity unit would exist so that at any time (at maturity or prior) the units could be combined by a creation agent such as creation agent 410 (FIG. 4A) and redeemed for the underlying reference assets 423. Exemplary processes for unit creation and redemption are illustrated and described in greater detail herein. The existence of income and equity units could be electronically tracked by an ETF sponsor such as ETF Sponsor 430 (FIG. 4A).

All equity and income unit dividends will be processed through, for example, the system of a global custodian who holds the underlying reference assets such as clobal custodian 424 (FIG. 4A) using processes such as those shown and described in greater detail herein. The system such as exemplary system 200 will store all information related to dividend dates including, but not limited to, record date, ex-dividend date, and payment date in its database such as database 210 (FIG. 2). This information allows the global custodian's system to accurately distribute the cash and non-cash distributions to the proper income and equity unit holders. After determining how the distributions should be distributed, the proper cash flows are delivered to the income and equity trusts such as income and equity trusts 415 and 416, respectively as further illustrated and described in detail herein.

In one exemplary embodiment, distributions are tracked and distributed as follows. Income trust 415 will receive cash flows 511 as follows: 100% Ordinary cash dividends; no non-ordinary dividends; and no asset appreciation/depreciation. These cash flows will be processed and then subsequently distributed to the owners of the income units less any fees to be charged to such owners. Equity trust 416 will receive cash flows 513 as follows: no ordinary cash dividends; 100% of non-ordinary and non-cash dividends; and 100% asset appreciation/depreciation. These cash flows 513 will be processed and then subsequently distributed to the owners of the expense units less any fees to be charged to such owners.

In the depicted embodiment, an exemplary system such as system 200 described above is utilized to execute value component tracking, sorting, and/or distribution processes to apportion value components to the income and equity trusts such as the exemplary processes illustrated and described herein. In the depicted embodiment, the global custodian 424 (FIG. 4A) holds the underlying reference assets 423 (FIG. 4A). The global custodian 424 uses various databases and algorithms to: track all value components related to the underlying reference assets 423; segregate the value components between the income and equity trusts; and distribute the value components accordingly. For example, the global custodian may have a dedicated server such as server 208, which executes the dividend tracking, sorting, and distribution algorithms. The data and other records related to these algorithms may be maintained in a database such as database 210. These algorithms may track, sort, and distribute value components based upon the methodologies described above or alternate methodologies with departing from the scope hereof.

Turning now to FIG. 6A, depicted is a table 600 of the potential investment results for investment in income and/or equity units in accordance with the present invention. Table 600 illustrates the flexibility offered by the present invention as the investors in income and/or equity units will be free to hold any combination of income and equity units despite the units being created in equal numbers during the creation process as discussed in greater detail above. As can be seen in the "All Growth" column 617, investors can choose to hold only equity units and thus not be entitled to any income value components (e.g., ordinary cash dividends) produced by the underlying reference assets. As such, equity unit buyers will receive the equity value components (e.g., appreciation/depreciation) only and may likely purchase these equity units at a discount relative to the cost to purchase the entire stock (i.e., the income and equity value components combined) since the investor is not receiving the income value components. Thus the present invention allows investors that are less concerned about a dividend cash flow stream to participate in stock appreciation/depreciation without having paid the embedded value of future dividends. Conversely, in the "All Income" column 618, investors can chose to hold only income units and receive only the income value components (e.g., the actual dividend cash flows generated by the underlying reference assets). As noted, income units are mostly a return of capital and thus will have no value after the income units' maturity date is reached. The price paid for each income and equity unit will be determined, like any other listed equity product, on a financial exchange such as financial exchange 112 and can differ from the price at which they were originally issued by the creation agent.

The results depicted in Table 600 are based upon the assumptions 611 that a $100 investment in a combination of one income unit and one equity unit of the same underlying reference asset represents economic ownership of an index with the following characteristics: 2% index dividend yield; income unit present value of $20; 10-year maturity; and equity unit valuation of $80. This base-line $100 portfolio is designated as the market portfolio 610 as it holds exactly one income unit valued at $20 and one equity unit valued at $80 which, if combined, would represent 100% of the economic interest of the underlying reference asset that was split and/or otherwise manipulated to create the respective income and equity units. Again, it should be noted that the value of the income and equity units will be determined by the financial exchange through which they are traded and these values may have no relation to their original issue price. Owners of the equity units in this example, participate in inherent leverage since they control 100% of the equity value components of the underlying reference assets but pay only 80% of the cost of the underlying reference asset as a whole.

Further, table 600 highlights other inherent leverage in income and equity unit investment by varying the dollar amount of the investments in the income and equity units, respectively, while still maintaining the $100 total investment. Assuming the baseline valuation of an income unit worth $20 and an equity unit worth $80, the table illustrates two unique combinations. The first is an all equity unit portfolio 617 maximizing the leverage to the index's growth 615 at 125%. The second is an all income unit portfolio 618 maximizing the leverage to the underlying reference asset's cash flow at 500% of the annuity-like income generated by the underlying reference asset's dividend yield. This leverage is done without the use of traditional leverage of investing on margin, but rather holding varying amounts in separately traded components of the underlying reference assets to reflect the relative preference of the investor for income versus capital appreciation.

Referring next to FIG. 6B, depicted is a graph 630 showing various combinations of income and equity unit holdings and the investor's resulting capital leverage 632 (left axis) and dividend income 634 (right axis). An inverse relationship exists such that a decreased capital leverage to the underlying index will result in an increased dividend income returned to the income unit investor (for any given level of overall investment).

Upon maturity, the income unit will have a value of zero as the annuity-like return of capital will be complete. Any appreciation/depreciation of the value of the income units could occur to factors including, but not limited to, varying dividend assumptions investors make over the life of the income units. The actual income value components will be determined, tracked, and distributed to the income unit owners utilizing automated processes such as those shown and described herein.

The flexibility of the present invention may be seen in graph 630 as it illustrates that income and equity units can be held in any combination resulting in different anticipated returns and income streams. Point 636 in FIG. 6B represents a portfolio that has been altered from the market portfolio 638 (described above with respect to FIG. 6A) to hold one half of the original equity units (worth $40) and three times the quantity of income units (worth $60). The value of the new portfolio D 636 has only 50% exposure to the price appreciation/depreciation of the underlying reference asset and has a return of capital invested equal to three times the dividend stream thereof (or 300% exposure to the index's 2% yield). As such, the income units are a return of capital and not a return on capital. The effective yield can be determined once the original investor cost of the income units are compared to the actual cash flows received by the investor from the income trust. This is just one example of the varying investment strategies that can be obtained by holding a portfolio of both income and equity units having varying percentages of each.

Figure 7:
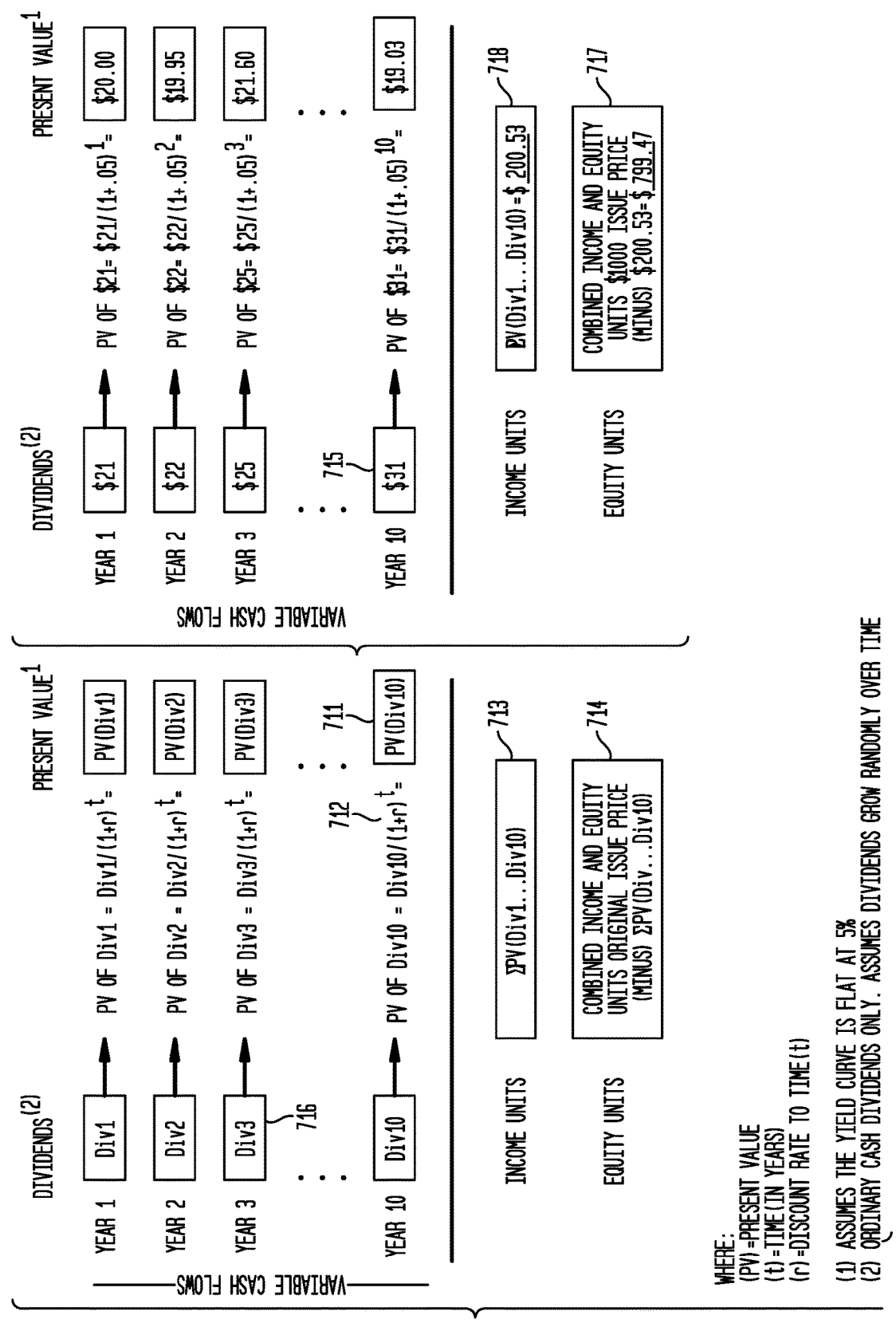
FIG. 7 depicts one exemplary methodology for pricing the original components (e.g., income and equity units) in accordance with one embodiment of the present invention.

Turning next to FIG. 7, depicted is one exemplary methodology for pricing the original components (e.g., income and equity units) of the invention. The income value component payments 716 (shown yearly) will be estimated for the duration of the income trust (e.g., 10 years in this exemplary embodiment). Several sources of publicly available information may be utilized to determine the expected dividend cash flows, growth rates and the appropriate discount rate for each of the assets of the underlying reference assets including, without limitation: 1) interest assumptions for the life of the assets or the income and equity trust; 2) the expected dividend policies and payout ratios for the individual assets in the underlying reference assets; 3) government and tax authority policies towards the payment of cash and noncash dividends; 4) relative attractiveness of equity participation versus the desire for more steady annuity type income over various periods of time. Each year's estimated dividends can then be mathematically discounted back to represent the present value 711 of those dividends using a discount rate deemed reasonable by the investor. One exemplary method of determining the present value 712 is as follows:

Present value of income value components=Dividends in that year/[1+discount rate ($r$)] raised to ($t$) (time in years).

The summation 713 of these present value calculations 716 will represent the theoretical original issue price for the income units. Subsequently, the initial value of the equity units 714 will be the issue price of the combined income and equity units minus the income unit original issue price. However, alternate methods of setting original issue prices may be substituted without departing from the scope hereof.

The exemplary method shown in FIG. 7 makes several assumptions and is for illustrative purposes only: 1) individual year's dividends 715 are assumed to grow randomly over time ($21 in Year 1 to $31 in year 10); 2) the prevailing yield curve is assumed to be flat thus a single discount rate (5%) can be used in the present value algorithm 712 throughout the life of the income trust; 3) the summation 718 of the present values of ten (10) years of ordinary cash dividends is $200.53; and 4) the original issue price of the combined income and equity units is assumed to be $1,000 thus the equity unit original value 717 is calculated to be $799.47 (i.e., $1,000 combined income and equity unit original issue price minus $200.52 income unit calculated value).

This method 700 uses a reasonable discounted cash flow methodology to produce a value for all cash dividends (if any) to be received over the life of the income and equity trusts. This is only a theoretical value of the income value components of the underlying reference assets during the duration of the income and equity trusts as there are many factors that determine a company's dividend policy. In this example, the original issue price for the income units is $200.53. The secondary market price for the income units will be affected by a number of factors including, without limitation, the overall market expectation and timing of future dividends, prevailing interest rates, tax implications, and market factors of supply and demand. Since the depicted embodiment of the present invention contemplates the concurrent issuance of an equal number of income and equity units, the return characteristics of one income unit combined with one equity unit should equal the total return characteristics of one unit of the underlying reference assets.

Figure 8:
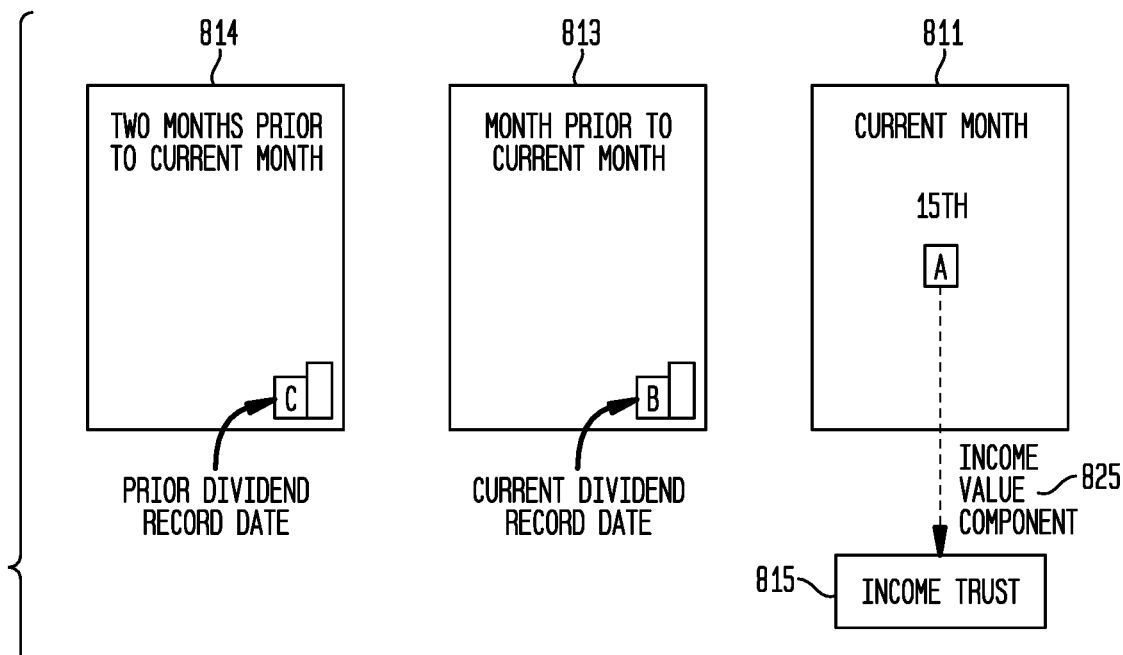
FIG. 8 depicts one method for distributing income to an income trust.

Turning now to FIG. 8, depicted is one method for distributing income value components to the income trust. In the depicted embodiment, the dividend tracking, sorting, and distribution algorithm discussed herein will reference the data records of the global custodian, as may be stored in global custodian database 210 (FIG. 2) to identify the type and quantity of income value components to be distributed to the income trust. All value components that are paid for the underlying reference assets will be initially held by the global custodian in a cash management account or the like until such time when the income trust will pay income value components to the owners of the income units through the trust's payment agent. The creation agent may continue to create new income and equity securities at any time to meet market demand.

For example, the dividend distribution algorithm may be programmed such that the income value component distribution date is the 15$^{th}$ day of the current calendar month 811. Distributions will be made to income unit owners of record as determined on the second to last New York business day (B) of the month prior to the current month 813. The actual amount of income value components paid by the underlying reference assets will be from, but excluding the prior dividend record date (C) two months prior to the current month 814 to and including the current dividend record date (B).

Also envisioned is a methodology for apportionment of primary issuance proceeds (and potentially tax basis) for both companies' (e.g., the income and equity trusts shown in FIGS. 4A and 4B) shares upon the simultaneous creation of new shares of both companies. More specifically, in the first public offering, the aggregate purchase price for the two units of each asset (i.e., the capital appreciation/equity share or equity unit and the dividend/income share or income unit) will be made based on the valuation by a qualified independent third party (e.g., a creation agent 1010) of the value of the dividend/income shares or income units. The issuance price of the equity units will be equal to the value of the underlying reference asset less the value of the corresponding income units. Thereafter, the proceeds from the creation of new units will be apportioned between the two investment companies based on a ratio of the secondary [closing] price on the primary exchange of the income units and the equity units.

More specifically, at the time of the very first creation of the equity units and income units (the initial primary issuance), the equity fund and the income fund will use the combined net proceeds of the sales to purchase the collateral to be held by the global custodian for the benefit of both investment companies. In the exemplary embodiment, these funds are in the form of investment trusts, however, alternate entities may be substituted without departing from the scope hereof.

The amount of total proceeds of the sales will be equal to the net asset value ("NAV") of the underlying reference assets (e.g., the value of the underlying reference asset as determined by, for example, a financial exchange). However, the portion of the NAV to be apportioned to the income fund will be the portion that a qualified independent third party deems to be the appropriate fair value of the dividends it is to receive from the global custodian pursuant to the apportionment rules. The remainder of the NAV will be paid to the equity fund. The equity and income funds will then issue an equal number of income units and equity units for the primary issuance process to be sold to the same investors.

After the initial income and equity units are issued, additional primary income and equity units may be created. Certain creation agents, as designated by the income and equity funds from time to time in their sole and absolute discretion, may purchase additional primary units from the income and equity funds in minimum denominations. These additional primary units will also be issued pursuant to a co-registration statement filed with all necessary regulatory agencies. As such, each creation agent will purchase an equal number of both income units and equity units from the respective funds. The creation agent shall deliver to the global custodian cash (or an amount of underlying reference assets of each trust) in an amount equal to the NAV of the underlying reference asset for the collective benefit of both the income and equity funds. However, the issuance proceeds from the combined primary sale will be allocated to the income and equity funds in proportion to the relative secondary market closing prices of the income and equity units.

The combined income units and equity units' secondary market prices can differ from the value of the underlying reference asset. Also, new primary units can be issued at any time by the equity and income funds via a creation agent at NAV of the underlying reference assets. The NAV of the underlying reference assets may be different than the combined prevailing secondary market price for the combined equity and income units. However, in this embodiment of the present invention, new primary income and equity units can never be created at a price that is less than the NAV of the underlying reference assets. Net issuance proceeds for the income and equity units will be apportioned between the income and equity funds, respectively, based on the relative (closing) secondary market prices for each security on its primary exchange using the following formulas:

income unit primary issuance price proportion (%):
$I/(I+E)$ equity unit primary issuance price proportion (%):
$E/(I+E)$ wherein:
(I)=income unit [closing] secondary market price; and
(E)=equity unit [closing] secondary market price.

These percentages are then applied to the proceeds of the offering to determine each respective Issuer/Fund's primary issuance price. Proceeds of any additional primary issuance shall be apportioned accordingly.

income units primary issuance proceeds: $N*\{\{I/(I+E)\}\}$; and equity units primary issuance proceeds: $N*\{E/(I+E)\}$ wherein:
(N)=NAV of the underlying reference assets.

These formulas are intended to show yet another exemplary method of allocating the issuance proceeds for income and equity units between their respective funds. However, alternate methods may be substituted without departing from the scope of the present invention.

Figure 9:
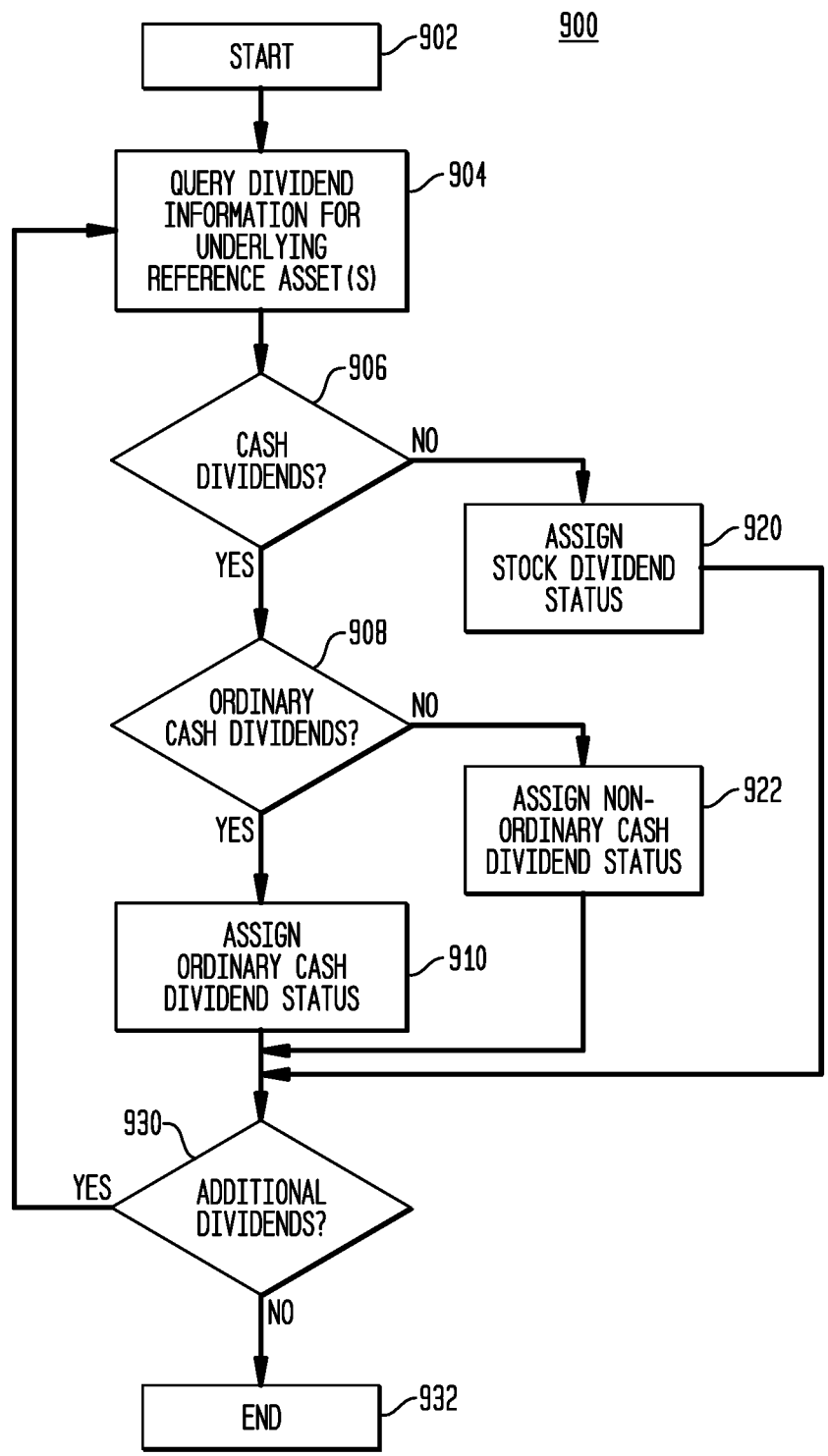
FIG. 9 depicts one method of sorting dividends in accordance with one embodiment of the present invention.

Referring now to FIG. 9, depicted is one process 900 for sorting dividends in accordance with one embodiment of the present invention. For example, process 900 may be utilized to determine which dividends are allocated to an income trust such as income trust 415 (FIG. 4A, 4B) and which are allocated to an equity trust such as equity trust 416 (FIG. 4A, 4B). For example, in some embodiments of the present invention, ordinary dividends are allocated to the income trust and non-ordinary dividends are allocated to the equity trust, wherein ordinary and non-ordinary dividends are defined by, for example, the terms of the equity and income unit issuance, which may therein refer to the CBOE. In the depicted embodiment, all received dividends will be sorted and classified as an ordinary cash dividend, a non-ordinary cash dividend, or a stock dividend.

Process 900 starts at 902, at which dividends have been issued for the underlying reference assets such as underlying reference assets 423 (FIG. 4A). Next, at 904, data regarding the dividends issued for the underlying reference assets is queried from, for example, one or more databases associated with one or more global custodians such as global custodian database 210. This dividend data information may include, without limitation, dividend types and quantities.

Process 900 then proceeds to 906, at which it determines whether a first dividend is a cash dividend. If no, process 900 proceeds to 920, at which the dividend is assigned a stock dividend status. Thereafter, process 900 proceeds to 930 to determine whether all dividends have been assigned a status. If yes, process 900 ends at 932. If no, process 900 returns to 904.

If at 906, the dividend is a cash dividend, process 900 proceeds to 908, at which it is queried to determine whether it is an ordinary or non-ordinary cash dividend. If ordinary, process 900 proceeds to 910 at which the dividend is assigned an ordinary cash dividend status. Alternatively, if the dividend is not an ordinary cash dividend, process 900 proceeds to 920, at which it is assigned a non-ordinary cash dividend status. Process 900 proceeds from 910 and 922 to 930, at which it determines whether all dividends have been assigned a status. If yes, process 900 ends at 932. If no, process 900 returns to 904 and proceeds as described in greater detail above. All assigned statuses will be saved to one or more global custodian databases 210 via one or more global custodian servers 208 such as those shown in FIG. 2.

Figure 10:
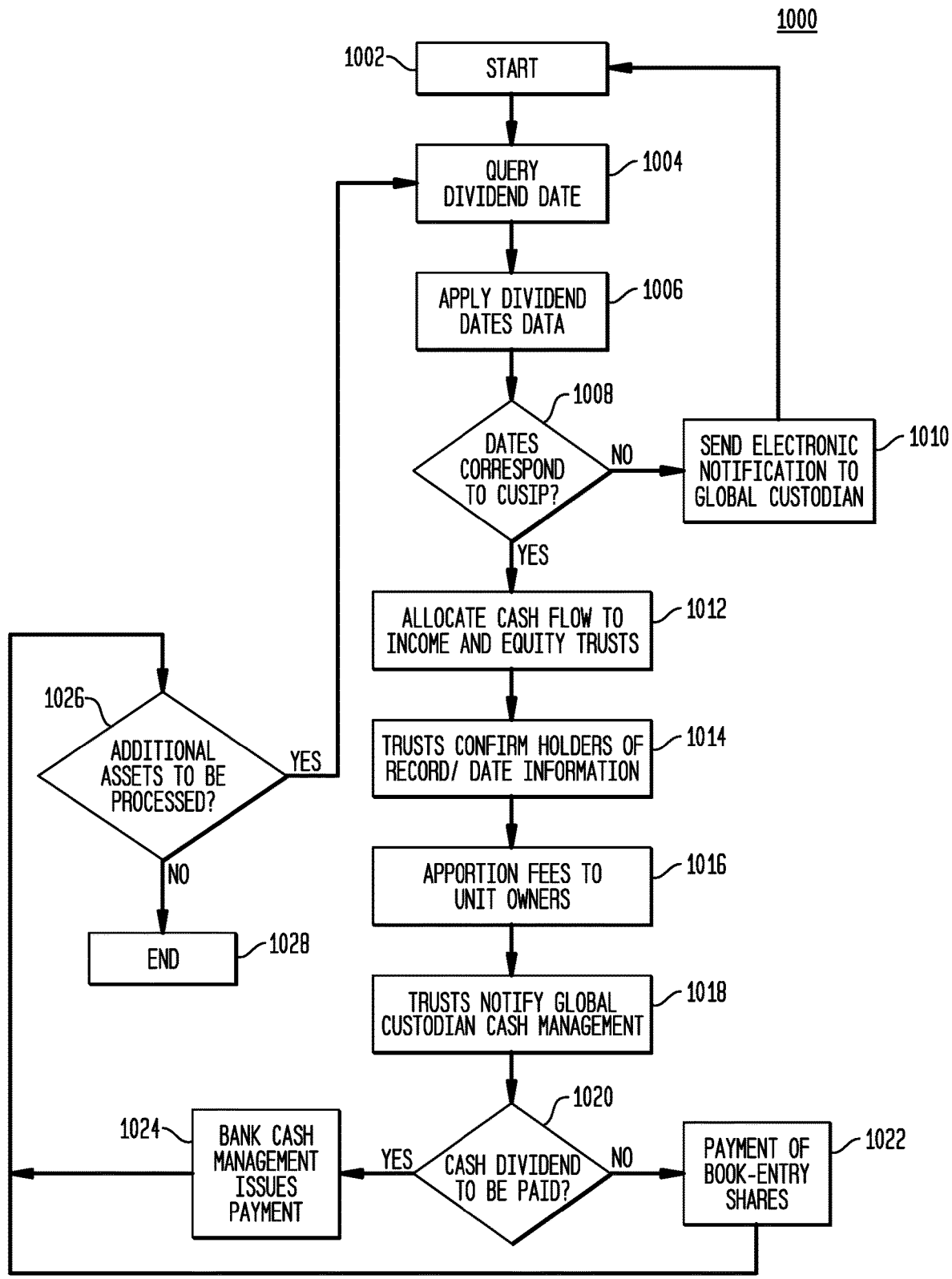
FIG. 10 depicts one method of paying dividends in accordance with one embodiment of the present invention.

Referring now to FIG. 10, depicted is one process 1000 for paying dividends in accordance with one embodiment of the present invention. FIG. 10 starts at 1002, typically after a process such as process 900 has been executed. Next, at step 1004, the dividend data is queried from one or more databases such as global custodian database 210 and financial exchange 1 database 231. This dividend information may include, without limitation, the dividend paid, dividend type, dividend declaration date (i.e., the date the dividend is announced by the Board of Directors), record date (i.e., date of record on or before which you must be on the company's books in order to receive the declared dividend), ex-dividend date (i.e., date on which an investor who purchases the stock will not receive the declared cash dividend but, instead, the seller of the stock will be entitled to that dividend), and payment date (i.e., date on which a scheduled and declared dividend will be paid). The dividend type may be assigned by a process such as process 900 as discussed in greater detail above.

Once the system has queried the divided date data, it applies the data to the dividend at step 1006 to determine when the dividend should be paid. Next, at 1008, the CUSIP for each asset of the underlying reference assets will be read in order to verify the divided data applied in step 1006. In the event the CUSIP data does not correspond with the data queried in steps 1004, an electronic notification is sent to the global custodian or other responsible party at 1010. Thereafter, process 1000 returns to step 1004 to process any remaining dividend data.

Alternatively, if at 1008, the CUSIP data verifies the data queried in steps 1004, then, at this point in the process, all assets in the underlying reference assets have been verified, their associated dividends confirmed, and their status has been applied.

Next, process 1000 proceeds to 1012, at which process 1000 allocates the dividend proceeds to the respective income and/or equity trusts, depending upon the type of dividend proceed and the rules set in place at the time of issuance of the income and equity units. Further, the income and equity trust dividend proceeds are transferred to the global custodians associated with each of the income and equity trusts, respectively.

Figure 11A:
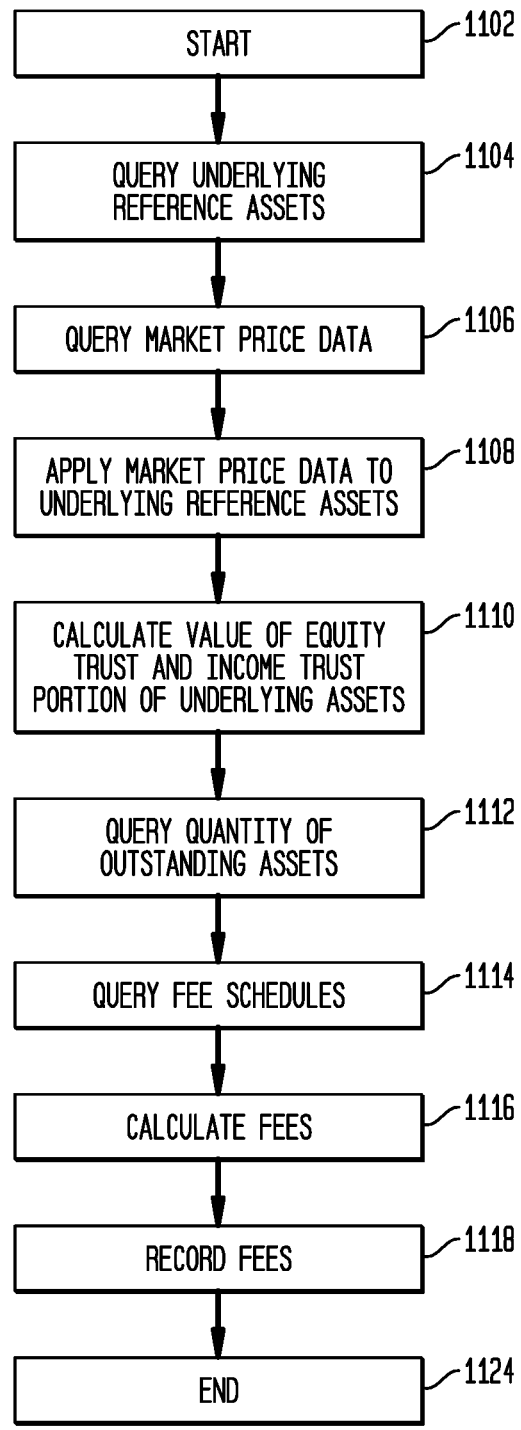
FIG. 11A depicts one method of assessing fees for the income and equity units in accordance with one embodiment of the present invention.

Next, at 1014, each of the income and equity trusts confirms the holders of record at the time of the dividend proceed allocation. Process 1000 then proceeds to 1016, at which fees are apportioned to the holders of record of the income and equity units at the time of the dividend proceed allocation. In the depicted embodiment, this is done as part of a process such as process 1100 as depicted in FIG. 11A and as described in greater detail herein. For example, once these fees are recorded at step 1118 (FIG. 11A), they are then available in the respective database for retrieval by process 1000. Also, a process such as process 1100, or portions thereof, may be executed as a sub process of process 1000.

Next, at 1018, the income and equity trusts notify the cash management division of their respective global custodians that the dividends received should be dispersed to the respective equity and income unit holders. In the depicted embodiment, if, at 1020, the dividend is to be paid in cash, process 1000 proceeds to 1024, at which the cash management division issues payment (e.g., in the form of a check, electronic fund transfer, or the like). Or, if at 1020 the dividend is not to be paid in cash, process 1000 proceeds to 1022, at which the cash management division of the respective global custodian delivers the shares to the respective owner in industry standard book-entry form. Process 1000 then proceeds to 1026, at which it determines whether there are additional dividend payments to be processed. If yes, process 1000 returns to 1004 and repeats. If no, process 1000 proceeds to 1028, at which it ends.

Turning now to FIG. 11A, depicted is an exemplary process 1100 for assessing investor fees in accordance with one embodiment of the present invention. In the depicted embodiment, process 1100 starts at 1102, and process 1100 is programmed to execute every 24 hours. However, alternate time periods or methods of initiating processes such as 1100 may be substituted without departing from the scope herein. Also, in the depicted embodiment, different methods of assessing fees are utilized for the equity and income units, however, alternate embodiments are envisioned in which the same method is used to assess fees for the equity and income units.

Process 1100 then proceeds to 1104, at which data regarding the underlying reference assets (e.g., underlying reference assets 423)(FIG. 4A) is queried from, for example, one or more databases associated with one or more global custodians. This data details information regarding the assets held by the equity and income trusts including, without limitation, types and quantities.

Next, at 1106, the market price data for the underlying reference assets is queried. Such data may be obtained, for example, from the various financial exchanges associated with the underlying reference assets utilizing a variety of methods including, without limitation, an Internet feed to one or more databases associated with the financial exchange(s).

Process 1100 then proceeds to 1108, at which the market price data for the underlying reference assets is applied to the underlying reference assets to determine the value of these assets as a whole (including both the income and equity components). This application may include, for example, multiplying the quantity of shares of an asset owned by the per share price of the asset. However, other methods of applying the market price data may be substituted without departing from the scope hereof.

Next, at 1110, the values of the portions of the Underlying Reference Assets owned by each of the Income and Equity Trusts is calculated. In the depicted embodiment, the present value of the portion of the Underlying Reference Assets owned by the Income Trust equals the value of all future ordinary dividend payments generated by the Underlying Reference Assets during the predetermined term of the Equity and Income Trusts. This value may be calculated using a process such as the exemplary process shown in FIGS. 11B and 11C. However, alternate embodiments of the present invention are envisioned in which the value of the income trust varies. For example, embodiments are envisioned in which the value of the income trust equals the value of all future non-ordinary dividends only or it equals the value of all future ordinary and non-ordinary dividends. Also, embodiments are envisioned for which income unit investors are entitled to all cash dividends until such time as these holders have been paid a pre-determined amount. Also, alternate embodiments are envisioned in which there are two income trusts, namely, a first lien income trust whose value equals the value of all future ordinary dividends and a second lien income trust whose value equals the value of all future non-ordinary dividends.

Correspondingly, the value of the portion of the underlying reference assets owned by the equity trust is determined by subtracting the NAV of the income trust from the NAV of the underlying reference assets as a whole as determined in step 1108. The value of the income and equity trusts are always independently maintained in order to offer income and equity units with distinctly different payoff characteristics. That is, income units are akin to a fixed term annuity that continuously returns dividends to its owner, whereas equity units represent appreciation and depreciation of the underlying reference asset(s) but excludes these dividend payments.

Process 1100 then proceeds to step 1112, at which the total quantity of outstanding income and equity units is determined. This data may be obtained, for example, from one or more creation agent databases such as creation agent database 218. Thereafter, at 1114, the fee schedules for each of the income and equity units is queried. In the depicted embodiment, the fee schedule for each type of unit varies due to the different investment characteristics (i.e., dividends versus asset appreciation/depreciation). However, alternate embodiments are envisioned in which the same fee schedule is applied to both equity and income units. In some embodiments of the present invention, such fee schedules may be retrieved from one or more databases associated with an ETF Sponsor or one or more global custodians. However, other entities may provide such fee schedules without departing from the scope of the present invention.

Next, at 1116, the fees are calculated for the income and equity units. In the depicted embodiment, the fees for the Equity Units are calculated according to the following calculation:

(NAV of Underlying Reference Assets ($)*pre-determined percentage rate)/quantity of outstanding equity units.

In the depicted example of the present invention, this methodology is utilized because, upon termination of the income and equity trusts, the equity units will have a value essentially equivalent to the value of the underlying reference assets and as a result thereof, the equity units should theoretically have a positive economic value. Consequently, it is appropriate to apply a percentage rate fee for the management of the equity units.

In another embodiment of the present invention, the fees to be assessed for each equity unit could be calculated according to the following:

(NAV of One Equity Unit)*(Pre-determined Percentage Rate)

Figure 11B:
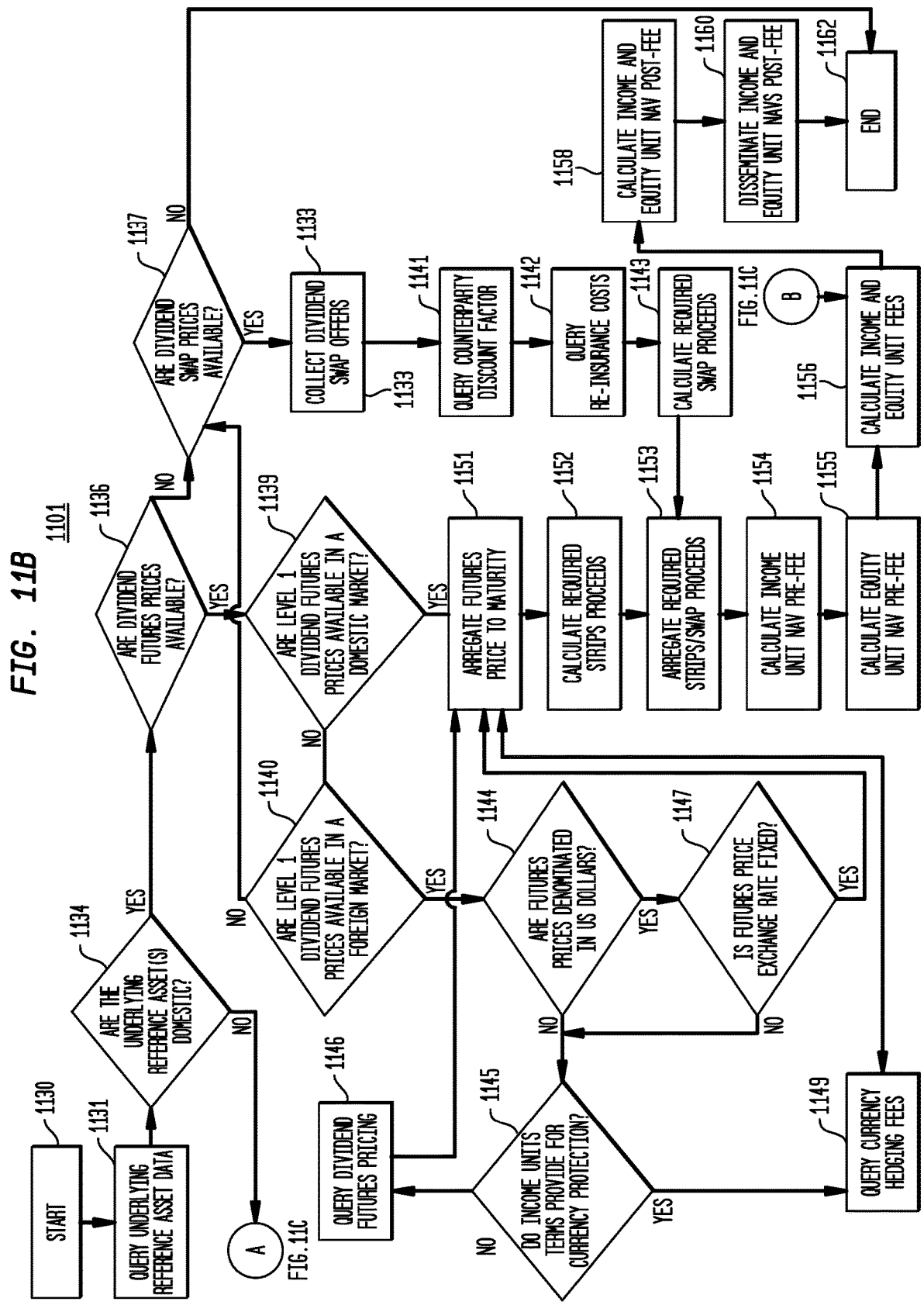
FIGS. 11B and 11C depict one method of calculating and disseminating the NAV of the income and equity units in accordance with one embodiment of the present invention.
Figure 11C:
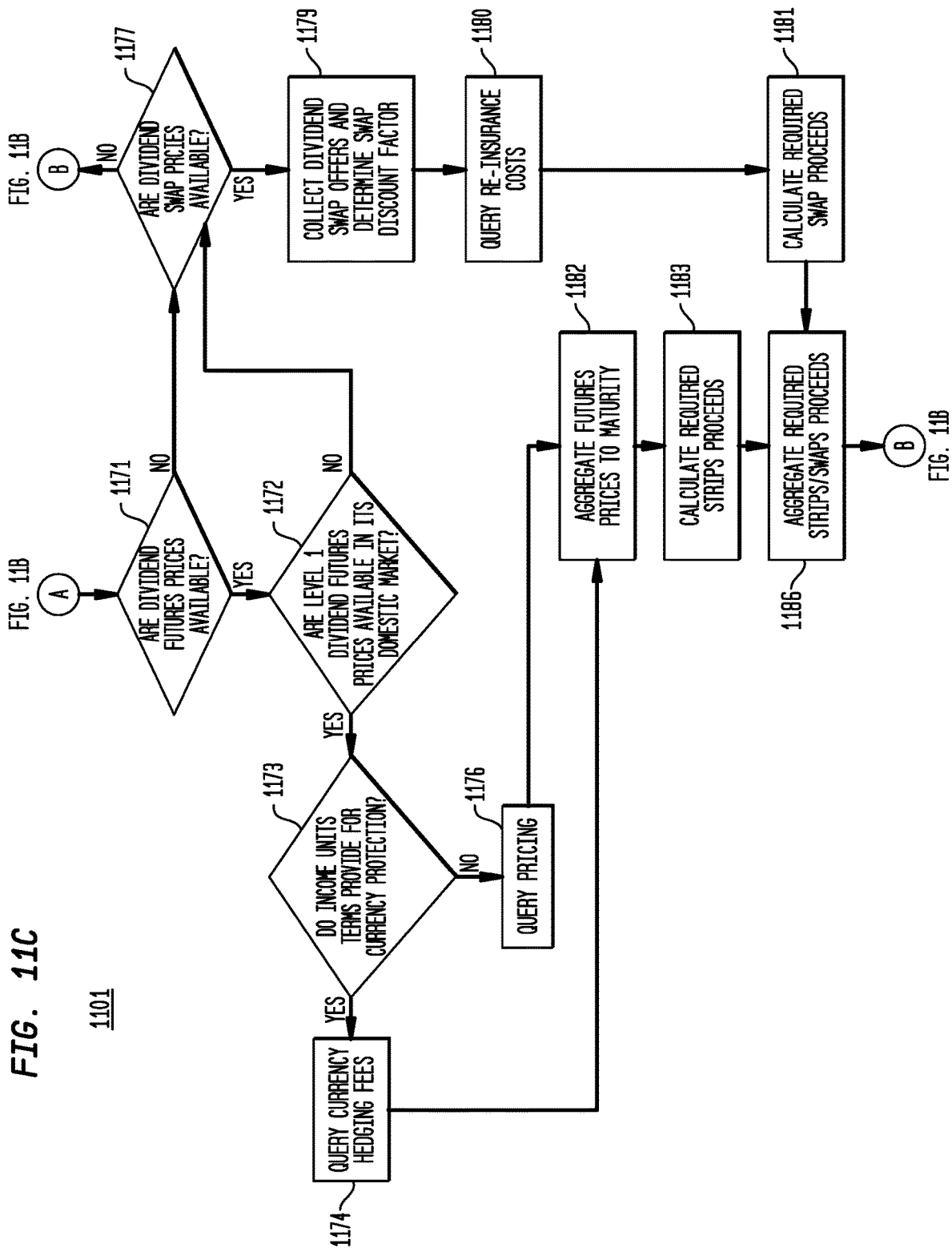

The NAV of one (1) equity unit may be calculated, for example, using a process such as process 1101 as depicted in FIGS. 11B and 11C. However, these examples are for illustrative purposes only and alternate methods of assessing equity unit and income unit fees may be substituted without departing from the scope hereof.

In the depicted embodiment, the fees for the income units are calculated according to the following calculation:

Quantity of Outstanding Income Units*Pre-Determined Flat Fee per Income Unit ($)

In the depicted example of the present invention, this methodology is utilized because, upon termination of the income and equity trusts, the income units will have a value of zero. Consequently, it is appropriate to apply a Flat Fee per Income Unit rate for the management of the income units. However, alternate methodologies may be substituted for assessing fees to the income unit owners and/or equity unit owners without departing from the scope hereof.

After calculation, the income and equity unit Fees are recorded at step 1118. In an embodiment such as that depicted in FIG. 10B, such fee schedules may be recorded in one or more databases associated with an ETF sponsor, one or more global custodians, or one or more investment manager(s) acting as the fiduciaries of the trust(s). Next, at 1124, process 1100 ends until it is re-initiated via time clock, manually, or otherwise.

Turning now to FIG. 11B, depicted is an exemplary process 1101 for calculating the NAV of the income and equity units in accordance with one embodiment of the present invention. In the depicted embodiment, process 1101 is executed by a server associated with, for example, the asset manager affiliated with each of the income and equity trusts. However, alternate embodiments are envisioned in which parties other than the asset manager execute process 1101 or a plurality of asset managers independently handle the assets of each trust.

Process 1101 starts at 1130 and it is programmed to execute as needed in order to comply with the requirements of the financial exchange through which the income and equity units are traded and/or applicable laws. For example, process 1101 may be executed every 15 seconds in order to disseminate the value of the income and equity units to the respective financial exchange via electronic media every 15 seconds. However, or other time periods may be substituted as required, for example, by applicable law and/or financial exchange requirement.

Process 1101 then proceeds to 1131, at which data regarding the underlying reference assets (e.g., underlying reference assets 423) is queried. For example, data may be queried from one or more databases associated with one or more global custodians such as database 210 via global custodian server 208 (FIG. 2). This data details information regarding the assets held by the equity and income trusts including, without limitation, types and quantities. Also, data may be queried from one or more databases associated with one or more creation agents (also referred to as Authorized Participants) such as database 218 via creation agent server 216 (FIG. 2). This data details information regarding the underlying reference assets associated with the income and equity units for which NAVs will be calculated. Such information may include, for example, information including, without limitation, asset types and quantities.

Next, process 1101 proceeds to 1134, at which it determines whether the underlying reference assets are domestic, foreign, or a combination of the two relative to the market issuing the equity and income units. If the assets are domestic to the issuance market, or if they are a combination of domestic and foreign assets that is calculated in U.S. dollars and predominately trade in the U.S., process 1100 proceeds to 1136, at which process 1101 determines whether dividend futures prices are available for the underlying reference assets.

If yes, process 1101 proceeds to 1139, at which it determines whether the dividend futures associated with the dividend futures pricing available at 1136 qualify as Level 1 dividend futures under Financial Accounting Standards Board ("FASB") Statement of Financial Accounting Standards ("SFAS") number 157 whose prices are readily available for such futures in the domestic market (e.g., via CME Group). If yes, process 1101 proceeds to 1151, at which the prices for such dividend futures are retrieved from the appropriate dividend futures price server 220 and its associated dividend futures pricing database 222 (FIG. 2)(for example, via an Internet feed) and are aggregated for each payment date of the income units through maturity.

Next, process 1101 proceeds to 1152, at which information is queried regarding the United States Treasury's Separate Trading of Registered Interest and Principal of Securities ("STRIPS") market via, for example, U.S. Treasury server 224 and database 226 as need in order to calculate the required STRIPS proceeds necessary to meet the future obligations of the income trust. For example, in the depicted embodiment, information is gathered to match the maturity, quantity and par amount of a quantity of US Treasury STRIPS to the price, date and quantity of dividend futures for each scheduled dividend future payment date based on the number of outstanding income and equity units. During step 1152, all quantities and expiration dates of the purchased STRIPS are matched to associated payment amounts that are due from the income trust under all dividend future contracts throughout maturity of the income units.

Next, at 1153, the required STRIPS proceeds calculated in step 1152 are aggregated to determine the total price needed to satisfy all dividend future contract obligations (or swap payments if step 1153 is entered from steps 1137-1143). Next, at step 1154, the Pre-Fee Income Unit Net Asset Value (before assessment of fees such as those calculated in FIG. 11A) is determined by dividing the value calculated in step 1153 by the quantity of outstanding income units.

Next, process 1101 proceeds to 1155, at which it determines the value of the Pre-Fee Equity Unit NAV (before assessment of fees such as those calculated in FIG. 11A) by subtracting the Pre-Fee Income Unit NAV calculated in step 1154 from the NAV of one unit of the underlying reference assets (i.e., the NAV of all underlying reference assets divided by the total quantity of outstanding income or equity units).

Process 1101 then proceeds to 1156, at which periodic fees for both the income and equity units are determined utilizing a process such as process 1100 as depicted in FIG. 11A). Next, process 1101 proceeds to 1158, at which the Post-Fee Income Unit NAV and Post-Fee Equity Unit NAV are calculated by subtracting the income unit fees and equity unit fees, respectively, (as calculated in step 1156) from the Pre-Fee Income Unit NAV and Pre-Fee Equity Unit NAV fees, respectively, (as calculated in steps 1154 and 1155).

Next, at step 1160, the Post-Fee Income and Equity Unit NAVs calculated for the income and equity units in step 1158 are disseminated via electronic media every 15 seconds or other time period as required by applicable law or exchange requirement. Such information may be disseminated, for example, via a network such as network 206 (FIG. 2) to the appropriate servers including, without limitation, a financial exchange server such as server 228. Thereafter, process 1101 ends at 1162.

Referring back to step 1136, if dividend futures pricing is not available for the underlying reference assets, process 1101 proceeds to 1137, at which process 1101 determines whether dividend swap pricing is available. Process 1101 will continue to query both dividend future or swap market pricing every 15 seconds, however, there is no guarantee that trading will be continuous or prices will continuously change. For example, the prices may change on a less frequent basis (e.g., hourly or daily).

If no, process 1101 proceeds to 1162 at which it ends. Step 1162 would be reached in this scenario only in the rare circumstance in which the dividend futures and/or dividend swaps affiliated with the income and equity units stopped trading during the life of the income and equity trusts. If dividend swap pricing is available at 1137, process 1101 proceeds to 1133, at which the dividend swap offers are collected. Then, at 1141, the costs associated with the counterparties who entered the dividend swap process during creation of the income and equity units is queried. Next, at 1142, the costs associated with re-insurance is queried, however, this cost may be zero if no re-insurance was purchased during creation of the income and equity units.

Next, process 1101 proceeds to 1143, at which information is queried from a dividend swap server/database 232/234 as needed in order to calculate the required dividend swap proceeds necessary to meet the future obligations of the income trust including, without limitation, future dividend payments, counterparty fees, and/or reinsurance fees. For example, in the depicted embodiment, information is gathered to match the payment date, quantity and amount of a quantity of dividend swap to the par amount, date and quantity of U.S. Dividend STRIPS for each scheduled swap payment date based on the number of outstanding income and equity units in addition to all other liabilities owed by the income trusts. During step 1143, all quantities and payment dates of the payment liabilities under the dividend swap are matched to associated par amounts that are due from the U.S. Treasury STRIPS up to the maturity date of the income units. Thereafter, process 1101 proceeds to 1153 and executes as described above with regards to steps 1153 through 1162.

Referring back to 1139, if Level 1 dividend future pricing is not available in a domestic market, process 1101 proceeds to 1140 to determine whether such pricing is available in a foreign market (e.g., the Eurex Exchange, the London International Financial Futures and Options Exchange "LIFFE", etc.). If no, process 1101 proceeds to 1137, at which steps 1137-1162 are executed as described in greater detail above. If such information is available, process 1101 proceeds to step 1144.

At step 1144, process 1101 queries whether the prices available in step 1140 are in U.S. dollars. If yes, process 1101 queries whether the exchange rate associated with the prices of the dividend futures on the foreign exchange is fixed (as is the case, for example, with a "quanto" derivative). If yes, process 1101 proceeds to 1151 and proceeds therefrom as described in greater detail herein.

If, at 1144, the dividend futures pricing is not available in U.S. dollars or if, at 1147, the future pricing exchange rate is not fixed, process 1101 proceeds to 1145, at which process 1101 queries whether the terms of the income units issuance provide for currency protection. If no, process 1101 proceeds to 1146 at which the prices for such dividend futures are retrieved from the appropriate Non-US Dollar dividend futures price server 236 and its associated dividend futures pricing database 238 (FIG. 2)(for example, via an Internet feed). Thereafter, process 1101 proceeds to 1151 and proceeds therefrom as described in greater detail herein.

If, at 1145, the terms of the income unit issuance provided for currency protection, process 1101 proceeds to 1149 at which the costs associated with any currency hedging are queried. This allows such fees to be aggregated at 1151 along with the dividend futures prices. Thereafter, process 1101 proceeds to 1151 and proceeds therefrom as described in greater detail herein.

Returning back to step 1134, if the underlying reference assets are not domestic, process 1101 proceeds to 1171 as shown in FIG. 11C, at which process 1101 determines whether dividend futures pricing is available for the underlying reference assets.

If yes, process 1101 proceeds to 1172, at which it determines whether such dividend futures qualify as Level 1 dividend futures whose prices are readily available for such futures in its domestic market (e.g., the Eurex Exchange) for the underlying reference assets. If yes to both, process 1101 proceeds to 1173, at which process 1101 queries whether the terms of the income unit issuance provide for currency protection. If no, process 1101 proceeds to 1176 at which the prices for such dividend futures are retrieved from the appropriate Non-US Dollar dividend futures price server 236 and its associated dividend futures pricing database 238 (FIG. 2)(for example, via an Internet feed). Next, at 1182, the prices for such dividend futures are aggregated for each payment date of the income units through maturity.

Next, process 1101 proceeds to 1183, at which information is queried regarding the United States Treasury's STRIPS market via, for example, U.S. Treasury server 224 and database 226 as need in order to calculate the required STRIPS proceeds necessary to meet the future obligations of the income trusts. For example, in the depicted embodiment, information is gathered to match the maturity, quantity and par amount of a quantity of US Treasury STRIPS to the price, date and quantity of dividend futures for each scheduled dividend future payment date based on the number of outstanding income and equity units. During step 1183, all quantities and expiration dates of the purchased STRIPS are matched to the associated payment amounts due from the income trust under all dividend future contracts throughout the term of the income units.

Next, at 1186, the required STRIPS proceeds calculated in step 1183 are aggregated to determine the total price needed to satisfy all dividend future contract obligations (or swap payments if step 1186 is entered from steps 1177-1181). Next, process 1101 returns to 1154 (FIG. 11B) at which it proceeds as described in greater detail above.

Referring back to step 1171, if dividend futures pricing is not available for the underlying reference assets, process 1101 proceeds to 1177, at which process 1101 determines whether dividend swap prices are available. If no, process 1101 proceeds to 1162 (FIG. 11B), at which it ends. Step 1162 would only be reached in this manner in the rare circumstance in which the dividend futures and/or dividend swaps affiliated with the income and equity units stopped trading during the life of the income and equity trusts.

If Dividend Swaps are available at 1177, process 1101 proceeds to 1179, at which at which the dividend swap offers are collected and the costs associated with the counterparties who entered the dividend swap process during creation of the income and equity units is queried. Next, at 1180, the costs associated with re-insurance is queried, however, this cost may be zero if no re-insurance was purchased during creation of the income and equity units.

Next, process 1101 proceeds to 1181, at which information is queried from a dividend swap server/database 232/234 as needed in order to calculate the required dividend swap proceeds necessary to meet the future obligations of the income trust including, without limitation, future dividend payments, counterparty fees, and/or reinsurance fees. For example, in the depicted embodiment, information is gathered to match the maturity, quantity and par amount of a quantity of dividend swaps to the price, date and quantity of U.S. Treasury STRIPS to each swap payment date based on the number of outstanding income and equity units in addition to all other liabilities owed by the income trusts. During step 1181, all quantities, payment dates, and amounts due to the counterparty under the Dividend Swaps are matched to associated payment amounts that are due to the income trust from maturing U.S. Treasury Strips up to the maturity of the income units. Thereafter, process 1101 proceeds to 1186, and executes as described above with regards to steps 1186 through 1162.

Referring back to 1172, if Level 1 dividend future pricing is not available in a domestic market, process 1101 proceeds to 1173, at which process 1101 queries whether the terms of the income units issuance provide for currency protection. If yes, process 1101 proceeds to 1174 at which the fees associated with any currency hedging are queried. This allows such fees to be aggregated at 1182 along with the dividend futures prices. The currency hedging algorithm must simultaneously match dividend payments as and when they are declared to foreign exchange trades. Thereafter, process 1101 proceeds to 1182 and proceeds therefrom as described in greater detail herein.

Figure 12:
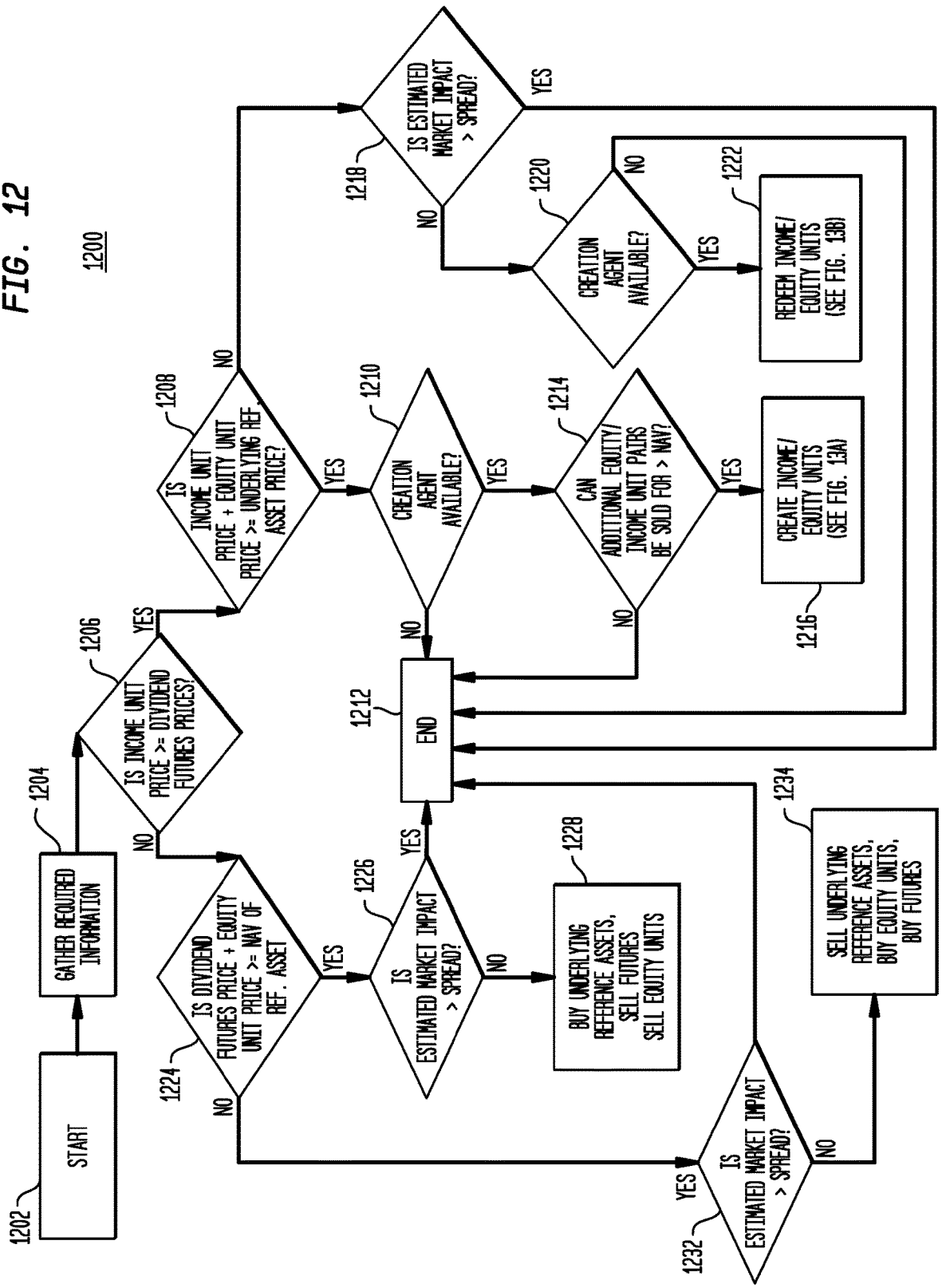
FIG. 12 depicts one method of assessing the fair value of income and equity units to allow creation agents to determine whether new income and equity units should be created or existing units should be redeemed in accordance with one embodiment of the present invention.

Turning now to FIG. 12, depicted is an exemplary process 1200 for assessing fair value to determine whether market conditions are favorable to the creation or redemption of new income and equity trust units, or to achieve market stabilization, in accordance with one embodiment of the present invention. That is, process 1200 helps the creation agents or other parties to evaluate the income and equity units' market supply and/or demand to help them determine whether the quantity of income and equity units should be increased (through issuance of new units) or decreased (through redemption of existing units). This process such as process 1200 may assist in the identification of arbitrage opportunities for the creation agents/authorized participants. Such a process compares the current market prices for both the dividend income of the income units and the appreciation/depreciation values of the equity units to their theoretical valuations based on both asset and futures prices simultaneously. These valuations of the underlying reference assets require certain assumptions that the financial markets could make based on various factors such as size, timing, and likelihood of dividend payments. If the process returns data to suggest additional income and equity units should be created or redeemed, the creation agents/authorized participants enter into the creation or redemption process as described in greater detail herein. If however, such conditions do not apply, the process reverts back to its ongoing monitoring of the supply and demand of such income and equity units until such conditions change.

When a process such as process 1200 determines that an excess supply or demand for income or equity units exist, or there is an opportunity for creation agents/authorized participants to earn a profit by creating or reducing market supply, the creation agent/authorized participant follows current industry norms by either buying or entering into a securities lending facility to borrow and deposit the underlying reference assets in sufficient size to create the income and equity units. In one embodiment, income and equity units can be created in an industry standard process termed an EFP, or exchange for physical, essentially an "in-kind" transfer of underlying reference assets for income and equity units. However, in contrast with the traditionally known EFP process, when an EFP process is performed in accordance with the present invention, at least two types of units are created (i.e., income and equity) instead of one.

In the depicted embodiment, process 1200 starts at 1202 and it is programmed to execute every 15 seconds when the respective financial exchange(s) are operating in order to continually assess whether income and equity units should be created or redeemed. However, other time periods may be substituted without departing from the scope of the present invention.

Next, at 1204, data required to execute process 1200 is obtained from the corresponding databases. For example, in the depicted embodiment of process 1200, data such as the following may be obtained: 1) NAV of the underlying reference assets (e.g., underlying reference assets 423) which may be queried from, for example, one or more global custodian server/databases 208 and 210 (FIG. 2); 2) data related to the issued income and equity units such as quantity and price data as may be obtained, for example, from a financial exchange 1 database such as database 231 (FIG. 2); and 3) dividend futures pricing as may be obtained, for example, from a dividend futures server/database 220/222. However, alternate information and/or alternate methods of obtaining the information necessary to execute process 1200 may be substituted without departing from the scope hereof.

After the necessary information has been obtained, process 1200 proceeds to 1206, at which it is determined whether the current value of the income units is greater than or equal to the dividend futures prices associated with the underlying reference assets for such income units. If yes, process 1200 proceeds to 1208, at which it is determined whether the sum of the price of one income unit and one equity unit is greater than or equal to the price of the underlying reference assets associated with such income and equity units. If yes, process 1200 proceeds to 1210, at which it is determined whether a creation agent is available to issue new income and equity units. If no creation agent is available, process 1200 proceeds to 1212, at which it ends.

If, at 1210, a creation agent is available, process 1200 proceeds to 1214, at which it is determined whether additional pairs of income and equity units can be issued at a price that is greater than the NAV of the currently available income and equity units. If yes, process 1200 determines that the economic conditions are favorable for the creation of new income and equity units and process 1200 proceeds to 1216, at which these units are created. The quantity of units to be created shall be greater than or equal to the minimum quantity set for issuance of additional income and equity units by a creation agent/authorized participant. However, alternate embodiments are envisioned in which this quantity varies.

Alternatively, if at 1208, it is determined that the sum of the price of income unit and one equity unit is less than the price of the underlying reference assets associated with such income and equity units, process 1200 proceeds to 1218. At 1218, process 1200 determines whether the estimated market impact is greater than the arbitrage spread. That is, process 1200 determines whether the market impact on the price of the income and equity units would nullify any economic benefit resulting from the redemption (the arbitrage spread). If yes, process 1200 proceeds to 1212, at which it ends.

If, at 1218, the estimated market impact is not greater than the arbitrage spread, process 1200 proceeds to 1220, at which it is determined whether a creation agent is available to redeem new income and equity units. If no creation agent is available, process 1200 proceeds to 1212, at which it ends.

If, at 1218, a creation agent is available, process 1200 proceeds to 1222, at which a quantity of income and equity units are redeemed. The quantity of units to be redeemed shall be greater than or equal to the minimum quantity set for redemption of income and equity units. However, alternate embodiments are envisioned in which this quantity varies.

Figure 13B:
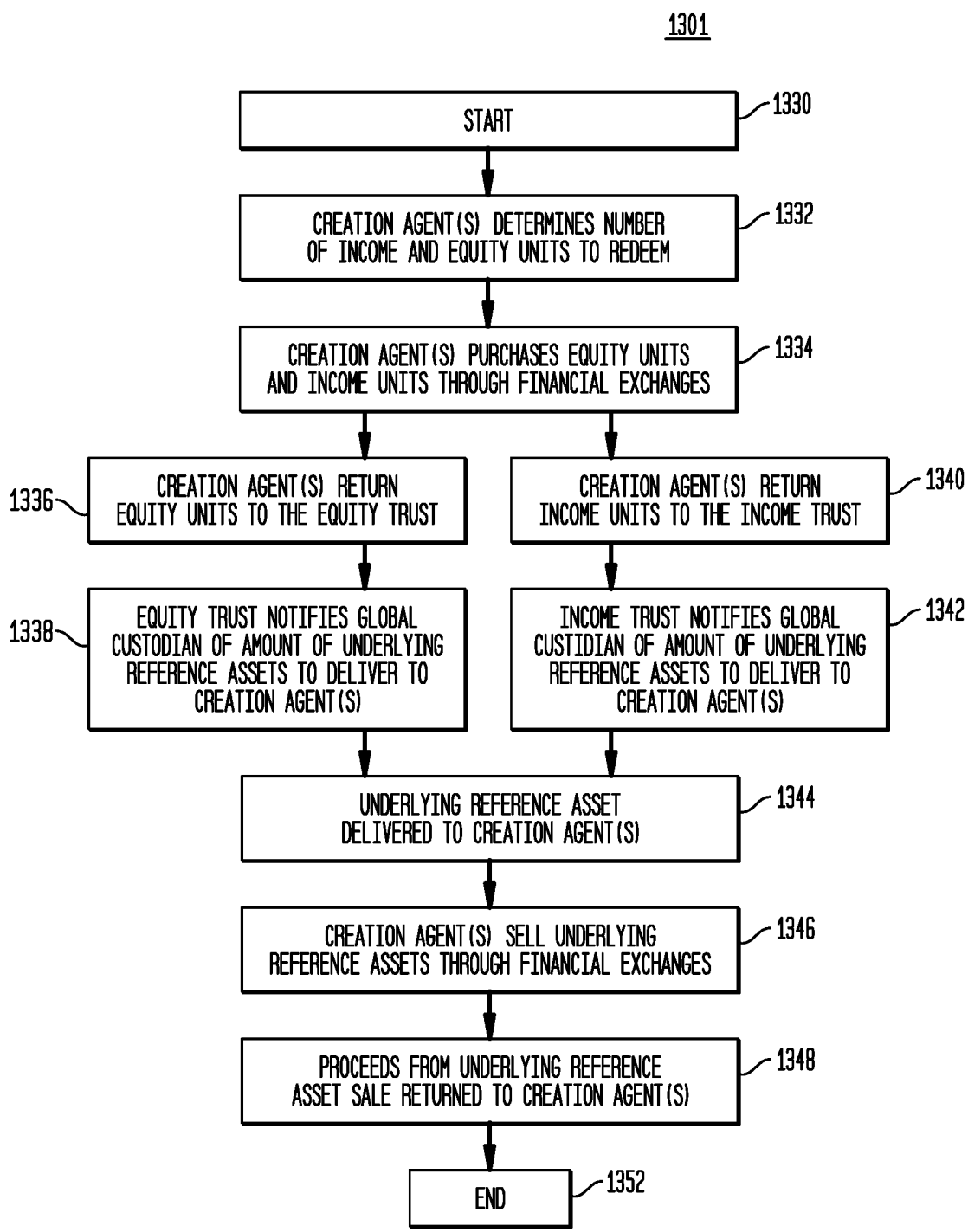
FIG. 13B depicts an exemplary process for redeeming income and equity units in accordance with one embodiment of the present invention.

One such process 1301 for redeeming income and equity units in accordance with the present invention is illustrated in FIG. 13B. Process 1301 starts at 1330, when it has been initiated, for example, by step 1222 of process 1200 (See FIG. 12). However, alternate methods of initiating the redemption of income and equity units may be substituted including, without limitation, manual initiation.

Next, at 1332, the creation agent(s) determine the quantity of income and equity units to be redeemed. In the depicted embodiment, income and equity units will be redeemed in equal, matching quantities. Next, at 1334, the creation agent(s) purchase the equity and income units from the financial exchange(s) upon which they are traded. Process 1301 then proceeds to 1336 and 1340, at which the creation agent(s) return the equity units and income units to the equity trusts and income trusts, respectively. Then, at 1338 and 1342, the equity and income trusts notify their respective global custodians (or a shared global custodian) of the amount/quantity of underlying reference assets that should be delivered to the creation agent(s) in exchange for the equity and income units delivered to the custodian(s) in steps 1336 and 1340.

Process 1301 then proceeds to 1344, at which the underlying reference assets determined in steps 1338 and 1142 are delivered from the equity and income trusts to their respective creation agents (or a shared creation agent). Next, at 1346, the creation agents sell the underlying reference assets received at step 1344 to the equity market through the respective financial exchange(s). Thereafter, at step 1348, the proceeds from the sale of the underlying reference assets at step 1346 are returned to the respective creation agent(s) (or a shared creation agent). Process 1301 then ends at 1352.

Referring back to 1206, if at 1206 it is determined that the current value of the income units is less than the dividend futures prices associated with the underlying reference assets for such income units, process 1200 proceeds to 1224, at which it is determined whether the sum of the dividend futures price associated with one income unit and the price of one equity unit is greater than or equal to the NAV of the underlying reference assets. If yes, process 1200 proceeds to 1226, at which it determines whether the estimated market impact of buying a quantity of underlying reference assets and/or selling all or a portion of the income units/dividend futures and equity units is greater than the arbitrage spread. In the depicted embodiment, such income units/dividends futures and equity units shall be transacted in equal quantities. That is, process 1200 determines whether the market impact on the price of the income and equity units due to the contemplated transactions is greater than the arbitrage spread. If yes, process 1200 proceeds to 1212, at which it ends.

If, at 1226, the estimated market impact is not greater than the arbitrage spread, process 1200 proceeds to 1228, at which a quantity of underlying reference assets are purchased and an economically equivalent value of dividend futures and equity units are sold. Step 1228 facilitates market stabilization of the future prices and equity unit prices in a scenario in which there is excess collective demand for the futures and equity units.

Referring back to 1224, if it is determined that the sum of the dividend futures price associated with one income unit and the price of one equity unit is less than the NAV of the underlying reference assets, process 1200 proceeds to 1232, at which it determines whether the estimated market impact of selling a quantity of underlying reference assets and/or buying all or a portion of the income units/dividend futures and equity units is greater than the arbitrage spread. In the depicted embodiment, such income units/dividends futures and equity units shall be transacted in equal quantities. That is, process 1200 determines whether the market impact on the price of the income and equity units due to the contemplated transactions is greater than the arbitrage spread. If yes, process 1200 proceeds to 1212, at which it ends.

If, at 1232, the estimated market impact is not greater than the arbitrage spread, process 1200 proceeds to 1234, at which at which a quantity of underlying reference assets are sold and an equivalent quantity of dividend futures and equity units are purchased. Step 1234 facilitates market stabilization of the futures and equity unit prices in a scenario in which there is excess collective supply of futures and equity units.

Figure 15:
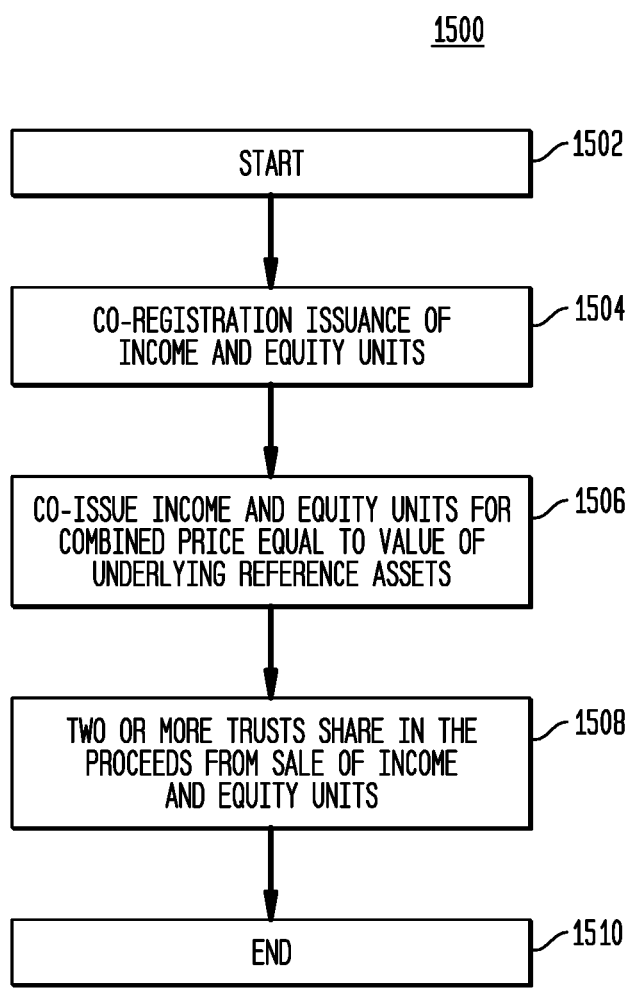
FIG. 15 depicts a method for providing equity and income value components of one or more stocks to investors in accordance with one embodiment of the present invention.

Turning now to FIG. 15, depicted is a process 1500 for providing equity and income value components of one or more stocks to investors in accordance with one embodiment of the present invention. Process 1500 starts at 1502 at which an entity wishes to issue income and equity units to a plurality of investors. Next, at 1504, a plurality of investment companies, for example, an income trust and an equity trust apply for co-registration of issuance of a plurality of income and equity units. Next, at step 1506, the income and equity units are co-issued and are sold for a price that is equal to the value of the underlying reference assets of the income and equity units. Process 1500 then process to 1508, at which two or more trusts share in the proceeds (apportioned based on the relative NAVs of the income and equity trusts as previously discussed herein) from the sale/co-issuance of the income and equity units at step 1506. Process 1500 then proceeds to 1510 at which it ends.

Although several processes have been disclosed herein as software, it may be appreciated by one of skill in the art that the same processes, functions, etc. may be performed via hardware or a combination of hardware and software. Similarly, although the present invention has been depicted as a hardwired system, these concepts may be applied to wireless systems and hybrid hardwired and wireless systems without departing from the scope of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims

The invention claimed is:

1. A method of trading component-dependent variable combinations of securities in underlying reference assets separated into income units and equity units, the method comprising the steps of:
   enabling investors to specify a component-dependent variable combination of equity units and incomes units representing an equity component and an income component;
   receiving the component-dependent variable combination that was specified by a specifying investor;
   determining the equity units and the income units needed for the component-dependent variable combination in accordance with how the specifying investor specified the component-dependent variable combination;
   combining the equity units and the income units determined in accordance with the component-dependent variable combination, on behalf of the specifying investor; and,
   holding the equity units and the income units combined in accordance with the component-dependent variable combination, on behalf of the specifying investor;
      wherein specifying the component-dependent variable combination includes specifying for each component a component multiple and a component percentage relative to the underlying assets; and
      wherein the income component provides investors with a dividend cash flow and the equity component provides investors with a stock price exposure in a ratio that is selected by the individual investor;
   creating an equity trust for issuance of a plurality of equity units associated with said one or more underlying reference assets;
   creating an income trust for issuance of a plurality of income units associated with said one or more underlying reference assets;
   co-registering issuance of said equity units and said income units with one or more regulating entities;
   co-issuing said equity units and said income units via at least one creation agent, said equity units to be sold to a plurality of equity unit investors and said income units to be sold to a plurality of income unit investors, a combined price of said equity units and said income units being equivalent to a total value of said one or more underlying assets;
   calculating, using a microprocessor, a first value of the equity components of said one or more underlying reference assets owned by said income trust and said equity trust;
   calculating, using a microprocessor, a second value of the income components of said one or more underlying reference assets owned by said income trust and said equity trust;
   allocating, using a microprocessor, the first value to be a value of said equity trust; and
   allocating, using a microprocessor, the second value to be a value of said income trust.

2. The method according to claim 1 further comprising the steps of:
   assessing, using a microprocessor, equity unit fees for management of said equity units to equity unit investors who own equity units; and
   assessing, using a microprocessor, income unit fees for management of said income units to income unit investors who own equity units.

3. The method according to claim 2 wherein a first structure for assessing equity unit fees varies from a second structure for assessing income unit fees.

37

4. The method according to claim 2,
wherein the fee per equity unit assessed for said equity units is based upon a first percentage of an equity unit NAV or a second percentage of said one or more underlying reference assets divided by a quantity of outstanding shares of said equity units; and
wherein the fee per income unit assessed for said income units is based upon a per income unit flat fee value.

5. A method of trading component-dependent variable combinations of securities in underlying reference assets separated into income units and equity units, the method comprising the steps of:
enabling investors to specify a component-dependent variable combination of equity units and incomes units representing an equity component and an income component;
receiving the component-dependent variable combination that was specified by a specifying investor;
determining the equity units and the income units needed for the component-dependent variable combination in accordance with how the specifying investor specified the component-dependent variable combination;
combining the equity units and the income units determined in accordance with the component-dependent variable combination, on behalf of the specifying investor; and,
holding the equity units and the income units combined in accordance with the component-dependent variable combination, on behalf of the specifying investor;
wherein specifying the component-dependent variable combination includes specifying for each component a component multiple and a component percentage relative to the underlying assets; and
wherein the income component provides investors with a dividend cash flow and the equity component provides investors with a stock price exposure in a ratio that is selected b the individual investor;
purchasing said one or more underlying reference assets to be held by one or more global custodians;
allocating, using a microprocessor, equity proceeds of a sale of said equity units to an equity trust; and
allocating, using a microprocessor, income proceeds of a sale of said income units to an income trust;
transferring dividends of said underlying reference assets from said equity trust to said income trust via contemporaneously executing a sale of a dividend asset to a market by said equity trust and a purchase of said dividend asset from the market by said income trust.

6. The method according to claim 5,
wherein the dividend asset is one or more dividend futures or one or more dividend swaps;
wherein the market is a dividend futures market or a dividend swap market; and
wherein the income component comprises a dividend cash flow and the equity component comprises a stock price exposure.

7. The method according to claim 6, wherein said underlying reference assets are purchased by said equity trust in exchange for the equity proceeds plus funds borrowed from a lender.

8. The method according to claim 7, further comprising the steps of:
purchasing income trust assets on behalf of the income trust in an amount equal to the income proceeds.

9. The method according to claim 8, wherein the income trust assets are STRIPS or dividend swaps.

38

10. The method according to claim 9, wherein the equity trust pays dividends of said underlying reference assets to the income trust in exchange for a return of said income trust assets.

11. The method according to claim 10, wherein the return of said income trust assets is a payment made to the income trust in accordance with one or more matured ones of said STRIPS or said dividend swaps.

12. A method of trading component-dependent variable combinations of securities in underlying reference assets separated into income units and equity units, the method comprising the steps of:
enabling investors to specify a component-dependent variable combination of equity units and incomes units representing an equity component and an income component;
receiving the component-dependent variable combination that was specified by a specifying investor;
determining the equity units and the income units needed for the component-dependent variable combination in accordance with how the specifying investor specified the component-dependent variable combination;
combining the equity units and the income units determined in accordance with the component-dependent variable combination, on behalf of the specifying investor; and,
holding the equity units and the income units combined in accordance with the component-dependent variable combination, on behalf of the specifying investor;
wherein specifying the component-dependent variable combination includes specifying for each component a component multiple and a component percentage relative to the underlying assets; and
wherein the income component provides investors with a dividend cash flow and the equity component provides investors with a stock price exposure in a ratio that is selected by the individual investor;
creating a holding trust for issuance of a plurality of component-dependent variable combination units associated with one or more underlying reference assets in accordance with the component-dependent variable combination specified by the specifying investor;
registering issuance of said component-dependent variable combination units with one or more regulating entities;
issuing said component-dependent variable combination units via at least one creation agent, said component-dependent variable combination units to be sold to a plurality of component-dependent variable combination unit investors, a combined price of said component-dependent variable combination units being equivalent to a total value of said one or more underlying assets;
calculating, using a microprocessor, an equity unit NAV;
calculating, using a microprocessor, an income unit NAV;
calculating, using a microprocessor, a component-dependent variable combination unit NAV; and
disseminating said equity unit NAV, said income unit NAV, and said component-dependent variable combination unit NAV to a financial market.

13. The method according to claim 12, further comprising the step of:
automatically evaluating, using a microprocessor, economic conditions to determine optimum timing for performing one of a group consisting of creating new ones of said income units and said equity units in matching quantities; redeeming equal quantities of said income units and said equity units; buying all or a portion of said underlying reference assets; selling all or a portion of said underlying reference assets; and any combination thereof.

14. The method according to claim 5 further comprising the step of:
   automatically evaluating, using a microprocessor, economic conditions to determine optimum timing for performing one of a group consisting of creating new ones of said income units and said equity units in matching quantities, redeeming equal quantities of said income units and said equity units, buying all or a portion of said underlying reference assets, selling all or a portion of said underlying reference assets, buying all or a portion of said dividend assets, selling all or a portion of said dividend assets, buying said equity units, selling said equity units, buying said income units, selling said income units, and any combination thereof.

15. The method according to claim 12,
   wherein ordinary cash dividends of the underlying reference assets are allocated to the income trust; and
   wherein non-ordinary cash dividends, non-cash dividends, and appreciation/depreciation of the underlying reference assets are allocated to the equity trust.

16. The method according to claim 15 further comprising the steps of:
   paying, via a microprocessor, the ordinary cash dividends to the income unit investors; and
   paying, via a microprocessor, the non-ordinary cash dividends, non-cash dividends, and the appreciation/depreciation to the equity unit investors.

* * * * *